United States Patent

Morita et al.

[11] Patent Number: 5,729,382
[45] Date of Patent: Mar. 17, 1998

[54] LARGE EXIT-PUPIL STEREOSCOPIC MICROSCOPE

[75] Inventors: Kazuo Morita, Hachioji; Toyoharu Hanzawa, Mitaka, both of Japan

[73] Assignee: Olympus Optical Co., Ltd., Tokyo, Japan

[21] Appl. No.: 499,131

[22] Filed: Jul. 7, 1995

[30] Foreign Application Priority Data

| Jul. 8, 1994 | [JP] | Japan | 6-179752 |
| Oct. 24, 1994 | [JP] | Japan | 6-282474 |
| May 12, 1995 | [JP] | Japan | 7-114872 |

[51] Int. Cl.⁶ ..................................... G02B 21/22
[52] U.S. Cl. .......................... 359/376; 359/373
[58] Field of Search ........................ 359/368, 369, 359/373, 376, 378, 384, 599, 69; 362/246, 355

[56] References Cited

U.S. PATENT DOCUMENTS

| 3,574,295 | 4/1971 | Tasaki | 95/18 |
| 4,012,109 | 3/1977 | Freeman | 350/36 |
| 4,015,898 | 4/1977 | Schirmer | 351/6 |
| 4,417,788 | 11/1983 | Alvarez et al. | 350/500 |
| 4,699,480 | 10/1987 | Pomerantzeff | 351/205 |
| 4,710,002 | 12/1987 | Pomerantzeff | 351/205 |
| 5,321,447 | 6/1994 | Sander et al. | 359/376 |
| 5,355,253 | 10/1994 | Nanjo et al. | 359/376 |
| 5,394,267 | 2/1995 | Hanzawa | 359/376 |
| 5,438,456 | 8/1995 | Grinblat | 359/376 |

FOREIGN PATENT DOCUMENTS 50-19936  7/1975  Japan.

*Primary Examiner*—Timothy P. Callahan
*Assistant Examiner*—My-Trang Nu Ton
*Attorney, Agent, or Firm*—Cushman, Darby & Cushman IP Group of Pillsbury Madison & Sutro LLP

[57] ABSTRACT

A stereoscopic microscope having right and left eyepiece lens systems for observation of two aerial images formed with parallax. The stereoscopic microscope comprises a main body housing and an eyepiece body housing which comprises an optical system ranging to aerial images formed at locations nearest the observer's eyes and eyepiece lens systems including transmission type light diffusing devices which are disposed in the vicinities of the aerial images formed at the locations nearest the observer's eyes, thereby permitting enlarging the exit pupils and performing stereoscopic observation with little fatigue.

28 Claims, 20 Drawing Sheets

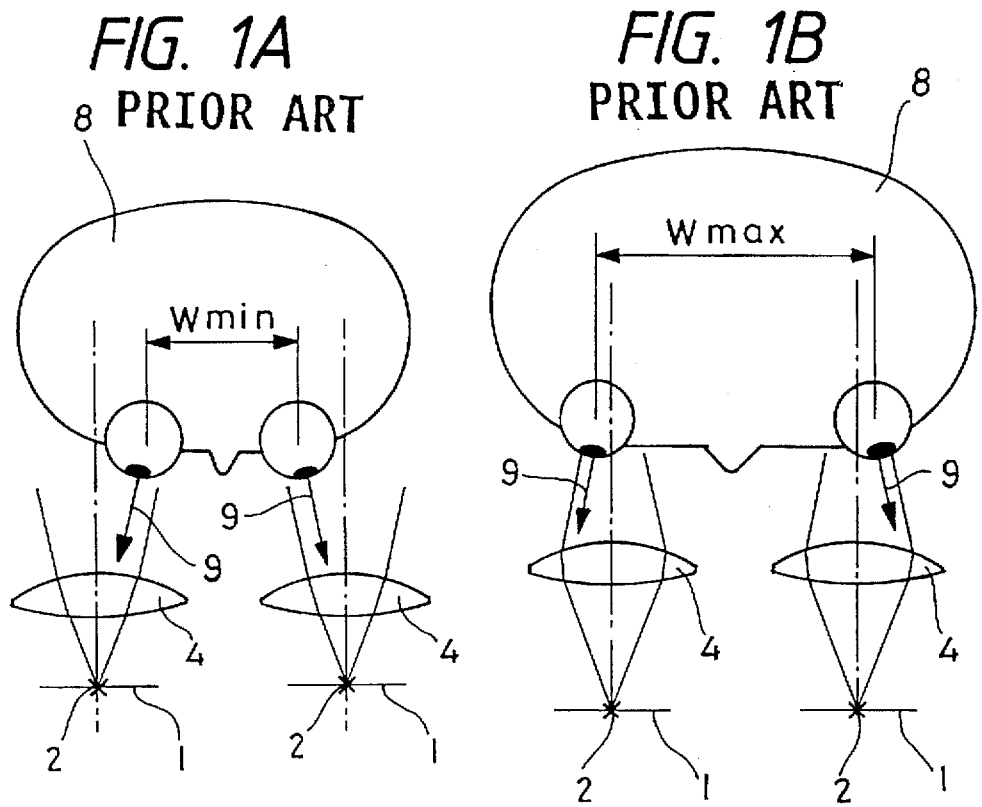
FIG. 1A PRIOR ART
FIG. 1B PRIOR ART
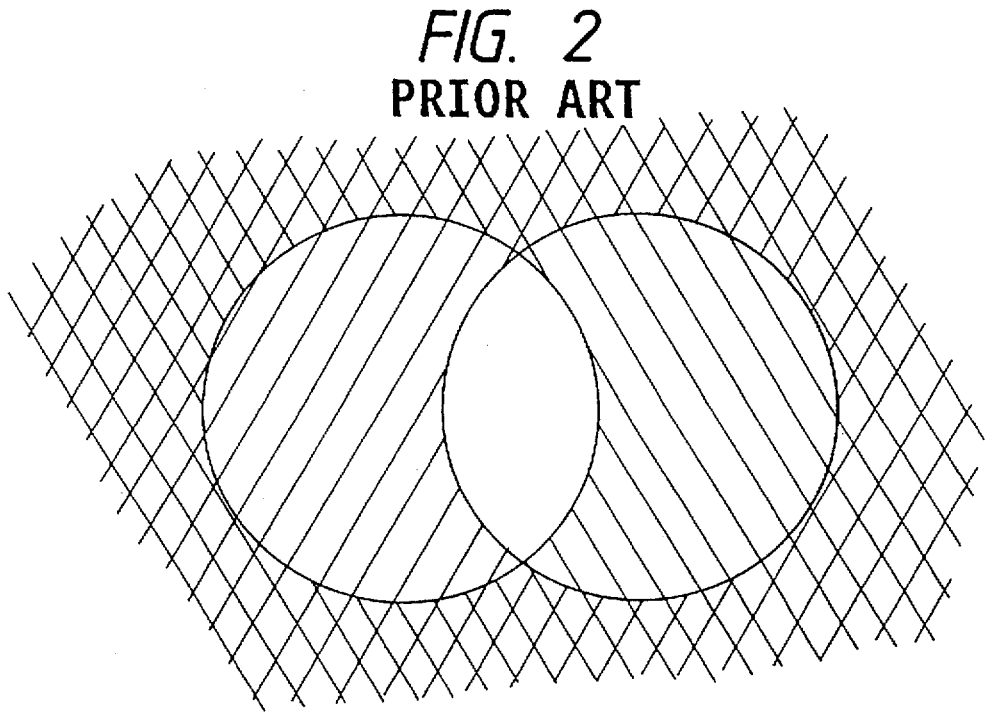
FIG. 2 PRIOR ART

LARGE EXIT-PUPIL STEREOSCOPIC MICROSCOPE

BACKGROUND OF THE INVENTION a) Field of the Invention

The present invention relates to a stereoscopic microscope which allows an observer to perform stereoscopic observation by his two eyes.

b) Description of the Prior Art

For observing an object through a stereoscopic microscope such as a surgical microscope, an observer is obliged for normal stereoscopic observation to perform two types of operations which are independent of each other: one for inter-pupil distance adjustment (an operation for matching a distance between optical axes of his right and left eyes with a distance between centers of exit pupils of right and left eyepiece lens systems of the stereoscopic microscope) and the other for diopter adjustment (an operation for matching diopter of the eyepiece lens systems with his visual power). A conventional stereoscopic microscope uses eyepiece lens systems which have very small exit pupils and allows an eclipse of an image to occur when the observer moves his head during observation, thereby obliging the observer to keep his head at a constant position while he performs the operations described above. Therefore, the conventional stereoscopic microscope has a defect that it gives a strong feeling of fatigue when he continues observation for a long time.

For correcting this defect there have already been developed methods to enlarge numerical apertures of emerging light bundles: one to enlarge a numerical aperture of a light bundle coming from an image by disposing a diffusing plate on an image surface to be observed through an eyepiece lens system and other to use a light bundle having a large numerical aperture by selecting an image formed on a TV monitor having a large numerical aperture as an image to be observed through an eyepiece lens system. During observation of an image through a stereoscopic microscope which has exit pupils enlarged by such a method, the image is eclipsed less as the exit pupils are enlarged, thereby reducing the feeling of fatigue of the observer.

Even during the observation through the stereoscopic microscope which has the exit pupils enlarged as described above, the observer must perform the inter-pupil distance adjustment and the diopter adjustment.

Further, there is now available a method which allows any observer, so far as he has an inter-pupil distance within an ordinary distribution range of inter-pupil distances of man, to observe images free from eclipses once he sets exit pupils of eyepiece lens systems so as to have a diameter (8 mm or longer) that can cover a variable range of inter-pupil distances of man (59 mm to 72 mm with a center located at 65 mm). However, this method inevitably deflects, outward or rightward and leftward, right and left lines 9 and 9 of vision of an observer 8 which are directed to centers of visual fields when he has an inter-pupil distances shorter than a spacing between centers of exit pupils of eyepiece lens systems as shown in FIG. 1A and adjusts diopter of the eyepiece lens systems 4 and 4 to the negative side or when he has an inter-pupil distance longer than the spacing between the centers of the exit pupils of the eyepiece lens systems as shown in FIG. 1B and adjusts diopter of the eyepiece lens systems 4 and 4 to the positive side. In these drawings, reference numerals 1 and 1 represent right and left images respectively, and reference numerals 2 and 2 designate centers of the right and left images respectively. Accordingly, this method may result in a condition where right and left visual fields of the observer are not matched with each other, thereby making it difficult for him to fuse the right image with the left image. In FIG. 1A and FIG. 1B, reference symbols $M_{min}$ and $M_{max}$ represent a minimum inter-pupil distance and a maximum inter-pupil distance respectively.

As is understood from the foregoing description, any of the methods which simply enlarge exit pupils does not make it possible for all observers to easily fuse right images with left images for stereoscopic observations over an entire range within which diopter is adjustable.

Like the stereoscopic microscopes and other optical instruments described above, binoculars and microscopes which are to be used for binocular observations and stereoscopic observations are configured so as to reduce fatigue during observations or facilitate stereoscopic observations. As an optical system which is configured so as to lessen fatigue during observation, there is known an optical system for forming enlarged exit pupils disclosed by Japanese Patent Kokoku Publication No. Sho 50-19,936. Owing to the function to enlarge exit pupils, this optical system serves for making it unnecessary to perform the inter-pupil distance adjustment and preventing images from disappearing due to vibrations of observers' heads and tilting of observers' heads. However, this optical system hardly allows one to enhance a magnification thereof due to a fact that it uses right and left eyepiece lens systems composed of a single lens component which is common to the right and left eyepiece lens systems as shown in FIG. 3. Accordingly, this optical system requires an objective lens system having a high magnification and sophisticated optical design as well as lens elements and parts which are manufactured with high precision.

Further, an eyepiece lens system which is composed of two lens components and generally used for binocular observations can have a high magnification, but requires large eyepiece lens components for enlarging a diameter of exit pupils and hardly allows observer's lines of vision to be verged for facilitated observations.

Stereoscopic microscopes have conventionally been used frequently for surgical operations owing to a merit thereof that it makes it possible to observe magnified images of locations to be operated, thereby enhancing efficiencies of surgical operations and performing other important roles. However, the stereoscopic microscopes which have conventionally been used as surgical microscopes have very small exit pupil diameters and allow images to be eclipsed when observers move their heads during observations. Accordingly, these stereoscopic microscopes oblige the observers to keep their head always at constant positions during surgical operations and other works, thereby giving a strong feeling of fatigue when they continue working for a long time.

The optical system for forming enlarged exit pupils disclosed by Japanese patent Kokoku Publication No. Sho 50-19,936 mentioned above adopts a transmission type light diffusing device which is disposed at a location of an aerial image for enlarging an exit pupil. However, this optical system comprises no eyepiece lens system for magnified observation of an aerial image formed by a microscope, but is of a type which forms a huge aerial image in a body of an optical apparatus. Accordingly, an optical apparatus which adopts the optical system will inevitably have a body remarkably enlarged.

Furthermore, it is very difficult to configure the conventional stereoscopic microscope described above such that it is compact and it cannot be used in practice as a surgical microscope on which a requite of a compact body thereof is imposed for enhancement of operability.

Moreover, the conventional stereoscopic microscope allows an aerial image formed for observation by a right eye to be overlapped at a certain location with an aerial image formed for observation by a left eye, thereby posing a problem of crosstalk that a light bundle which is originally to be incident on the right eye is actually incident on the left eye unless a sufficient distance is reserved from the overlapped aerial images to the eyes of the observer. Accordingly, the conventional stereoscopic microscope is apt to pose a problem that it desiables the observer from fusing the right image with the left image.

In addition, it has conventionally been desired to develop a microscope system which is configured so as to photograph, with a TV camera, a right image and a left image to be observed which are formed with parallax by a surgical microscope, display these images to be observed on two electronic image display devices such as liquid crystal monitors and allow magnified stereoscopic observation of these electronic images through two right and left eyepiece lens systems. When the eyepiece lens systems which are used on the ordinary surgical microscope for magnified observation of microscopic images are adopted for magnified observations of the electronic images formed on the electronic image display devices such as liquid crystal monitors, however, exit pupils of the eyepiece lens systems are enlarged due to a fact that light bundles emitted from the electronic image display devices such as liquid crystal monitors have relatively large numerical apertures. The ordinary eyepiece lens systems which are designed on an assumption of an exit pupil diameter of several millimeters do not eclipse images to be observed so far as observers' pupils are located outside the assumed exit pupils of several millimeters, but is incapable of forming images favorable for observations. Accordingly, such a microscope system will make it necessary to prepare eyepiece lens systems which are to be used selectively for different modes of application and two different types of eyepiece bodies.

SUMMARY OF THE INVENTION

A primary object of the present invention is to provide a stereoscopic microscope which has large exit pupils, and is configured so as to allow observers to perform stereoscopic observations while easily fusing images so far as they locate their eyes at any positions within ranges of the exit pupils.

Another object of the present invention is to provide an eyepiece optical system which is to be used for stereoscopic microscopes, etc., has a pupil diameter of at least 8 mm and a magnification of at least 5×, and facilitates observation with vergence.

Still another object of the present invention is to provide a stereoscopic microscope which is configured so as to be compatible with a compact body, allow crosstalk to occur less frequently during observation and use eyepiece lens systems having exit pupils enlarged for lessening fatigue of observers.

A further object of the present invention is to provide a stereoscopic microscope which is configured so as to permit selection between magnified observation through an eyepiece optical system and magnified observation on an electronic display device.

The stereoscopic microscope according to the present invention comprises an observation optical system which has right and left eyepiece lens systems disposed independently of each other at locations different from each other for magnified observation of two aerial images formed with parallax, and transmission type light diffusing devices disposed at locations or in the vicinities of two aerial images formed nearest observer's eyes within the observation optical system.

Since right and left eyepiece lens systems which are adopted for a stereoscopic microscope have a magnification of a certain level, aerial images formed in a microscope body for observation by an observer can be magnified by the eyepiece lens systems whether the images are large or small. It is therefore possible, by reducing a size of these aerial images to make the stereoscopic microscope compatible with a compact microscope body or prevent a microscope body from being enlarged by forming large aerial images therein. Since small aerial images are sufficiently usable for stereoscopic observation, imaging lenses for forming these aerial images can have a short focal length. Accordingly, it is possible to shorten a total length of an observation optical system and configure a microscope body to be compact.

The phrase "transmission type light diffusing device" is used to refer to an optical element which has a shape of a plane parallel plate, but functions to diverge a light bundle when it allows transmission, for example, of a parallel light bundle. When such transmission type light diffusing devices are disposed at locations or in the vicinities of the aerial images, light bundles passing through an observation optical system are diverged by the light diffusing devices, thereby finally enlarging exit pupils of eyepiece lens systems of the observation optical system.

Due to the divergence, however, light bundles which have passed through the transmission type light diffusing devices have a diameter larger than that of light bundles that passed through a conventional observation optical system and an optical system to be disposed after the transmission type light diffusing devices must use lens elements having diameters large enough, or which may be enlarge, to receive the thickened light bundles. In the stereoscopic microscope according to the present invention, the transmission type light diffusing devices are disposed at the locations or in the vicinities of right and left aerial images which are formed in an observation optical system at locations nearest an observer's eyes so as to allow a small optical system to be used after the transmission type light diffusing devices, thereby preventing the stereoscopic microscope from being enlarged. Accordingly, the stereoscopic microscope according to the present invention is compatible with a compact microscope body and is capable of enlarging exit pupils owing to the fact that it uses two eyepiece lens systems, and adopts the transmission type light diffusing devices disposed at the locations or in the vicinities of the two right and left aerial images which are formed in the observation optical system at the locations nearest the observer's eyes.

Further, the stereoscopic microscope according to the present invention can use, at a location before the transmission type light diffusing device, an optical system which is quite the same as that of the ordinary surgical microscope, thereby requiring no preparation of a particular optical system for enlarging the exit pupils and is compatible with the optical system for the ordinary surgical microscope.

Furthermore, the stereoscopic microscope according to the present invention forms the right and left aerial images independently of each other at different locations, thereby allowing right and left light bundles coming from imaging lens components to the eyes of the observer to be completely independent of each other and being capable of completely preventing crosstalk.

Moreover, the stereoscopic microscope according to the present invention is characterized in that it allows an observation optical system for magnified observation of microscopic images to be used commonly for magnified observation of electronic images formed on electronic image display devices, and that the common observation optical system is disposed in an eyepiece body housing together with mechanisms for switching between microscopic image observation and electronic image observation.

The stereoscopic microscope according to the present invention comprises, for example, right and left eyepiece lens systems which are preliminarily set so as to have large exit pupils, and an optical system which allows favorable magnified observations of microscopic images and electronic images formed on the electronic image display devices. The mechanisms for switching between microscopic image observation and electronic image observation are disposed in an eyepiece body. When the stereoscopic microscope according to the present invention is configured so as to have the configuration described above, it permits an observer to perform both the magnified observation of microscopic images and the magnified observation of electronic images by using a single eyepiece body unit. Other characteristics of the stereoscopic microscope according to the present invention will be apparent from the description of preferred embodiment thereof which is to be given later.

BRIEF DESCRIPTION OF THE DRAWINGS

FIG. 1A and FIG. 1B show sectional views illustrating directions of observer's lines of vision directed to centers of visual fields by using an inter-pupil distance and diopter which are preliminarily set for a conventional stereoscopic microscope;

FIG. 2 shows a diagram illustrating fusion of a right image and a left image in a condition where an observer observes through the conventional stereoscopic microscope;

DETAILED DESCRIPTION OF THE PREFERRED EMBODIMENTS

Now, the stereoscopic microscope using the transmission type light diffusing devices according to the present invention will be described in more detail below with reference to the preferred embodiments thereof illustrated in the accompanying drawings.

Figure 3:
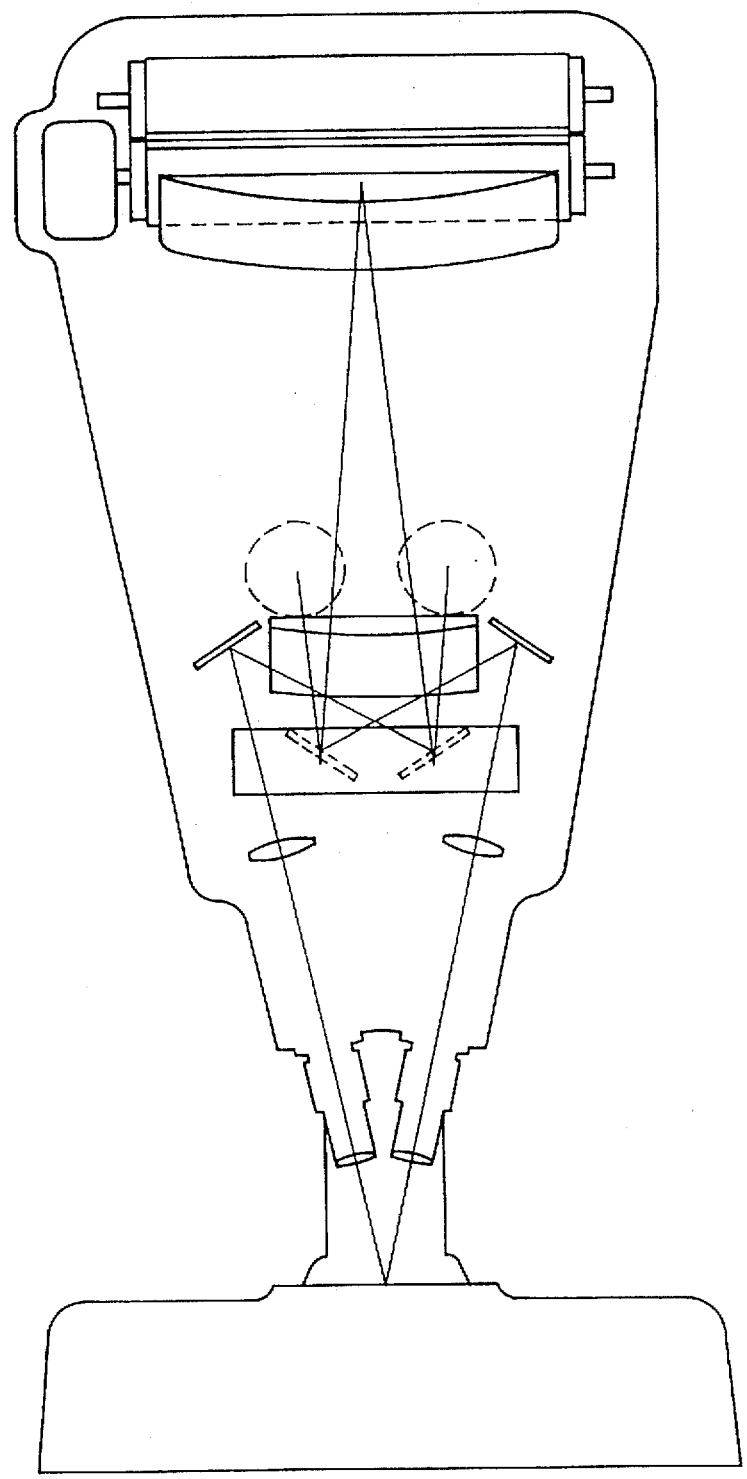
FIG. 3 shows a sectional view illustrating a composition of conventional eyepiece lens systems for binocular observation.
Figure 4:
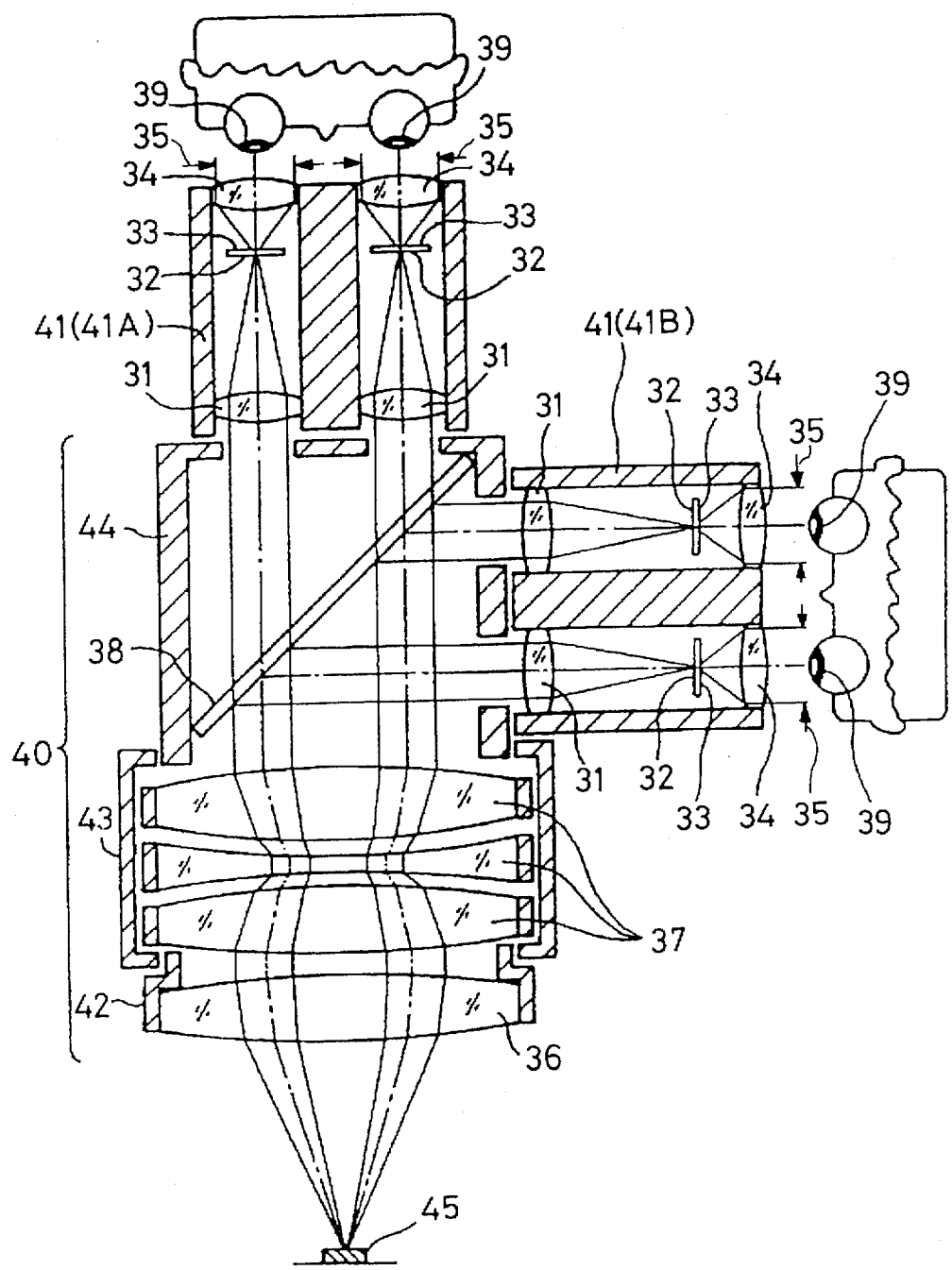
FIG. 4 shows a sectional view illustrating a composition of a first embodiment of the stereoscopic microscope according to the present invention.

FIG. 4 shows a first embodiment of the stereoscopic microscope according to the present invention. The first embodiment is configured so as to have large exit pupils of eyepiece lens systems, thereby lessening fatigue of observers, making the stereoscopic microscope compatible with a compact body and preventing crosstalk from occurring during observations.

The stereoscopic microscope preferred as the first embodiment of the present invention is composed of a main body housing 40, and an eyepiece body housing which consists of a housing for a housing 41A for a main observer and a housing 41B for an auxiliary observer.

The main body housing 40 is divided into as objective lens section 42 comprising an objective lens system 36, a vari-focal section 43 comprising a zoom lens system 37 and an optical path splitting section 44 comprising a half mirror 38. The objective lens system 36 and the zoom lens system 37 are coaxial optical systems which are common to right and left optical paths.

Each of the eyepiece body housings 41A and 41B accommodates a pair of imaging lenses 31, a pair of transmission type light diffusing devices 33 and a pair of eyepiece lens systems.

Light bundles emitted from an object 45 to be observed are transformed by the objective lens system 36 into nearly parallel light bundles, pass through the zoom lens system 37 and fall of the half mirror 38. Each of the light bundles is split by the half mirror 38 into two light bundles each having a light intensity half as high as that of the original light bundle and the four split light bundles pass into the eyepiece body housings 41A and 41B through two pairs of openings (pupils) formed in the light splitting section.

The imaging lenses 31 form right and left images of the object by using the nearly parallel light bundles which have emerged from the zoom lens system 37. Disposed at the locations of the aerial images are transmission type light diffusing devices 33 which diffuse light bundles coming from the images so that they have a large numerical aperture (NA) and are allowed to be incident on the eyepiece lens systems. The eyepiece lens systems form enlarged pupils at locations of eye points on the emergence side thereof so that the observer can observe the images of the object while keeping their eyes 39 at the locations of pupils.

In the first embodiment of the present invention, the light bundles emerging from the right and left imaging lenses 31 are diverged by the transmission type light diffusing devices 33 which are disposed in the vicinities of the locations of the aerial images 32 and enlarged exit pupils 35 are obtained by receiving the diverged light bundles with the eyepiece lens systems 34. Owing to the fact that the first embodiment adopts the transmission type light diffusing devices disposed at the imaging locations 32 which are nearest the observer's eyes 39, it uses a minimum number of lens components which have conventionally been obliged to be large enough for receiving the light bundles diverged or thickened by the transmission type light diffusing devices 33. In the stereoscopic microscope illustrated in FIG. 4, lens component which must be large are only those to be disposed in the eyepiece lens systems 34.

Further, the first embodiment makes it possible to adopt a remarkably compact microscope body since it uses the eyepiece lens systems 34 which have a magnification of a certain level for magnified observation of the aerial images, allow small aerial images to be used for observing images which are apparently large and permit disposing, at the locations of the aerial images, the transmission type light diffusing devices which are compact correspondingly to the small aerial images.

Since the first embodiment allows the imaging lenses 31 to form the small aerial images, it permits configuring these lenses so as to have a short focal length, thereby making it possible to shorten a total length of the observation optical system and configure remarkably compact a microscope body to be used for the stereoscopic microscope preferred as the first embodiment of the present invention.

Furthermore, the first embodiment requires no preparation of a special optical system since it permits adopting, as an optical system other than the eyepiece lens systems, an optical system which is the same as that of the ordinary surgical microscope.

As is understood from the foregoing description, the first embodiment makes it possible to configure a surgical microscope body compact and, since it enlarges the exit pupils of the eyepiece lens systems, it prevents images to be observed from being eclipsed due to movements of the observer's head, thereby lessening his fatigue during the observation. Moreover, the first embodiment which is compatible with small eyepiece bodies can be equipped with two eyepiece bodies for a main observer and an auxiliary observer respectively.

Figure 5:
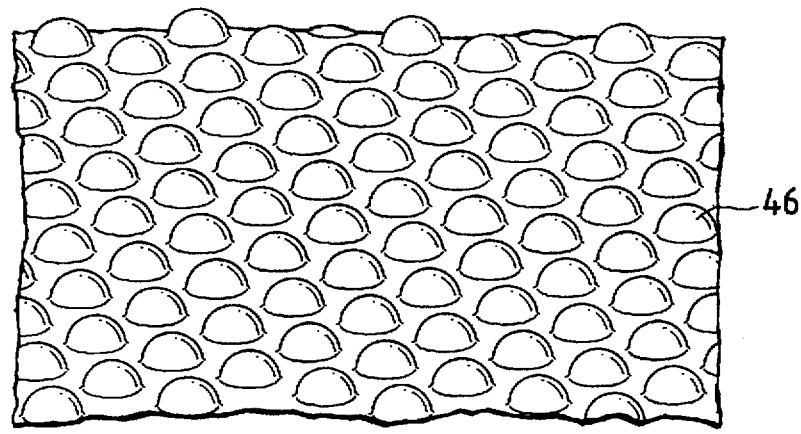
FIG. 5 shows a perspective view of a micro lens array which is to be used as a transmission type light diffusing device in the stereoscopic microscope according to the present invention.
Figure 6:
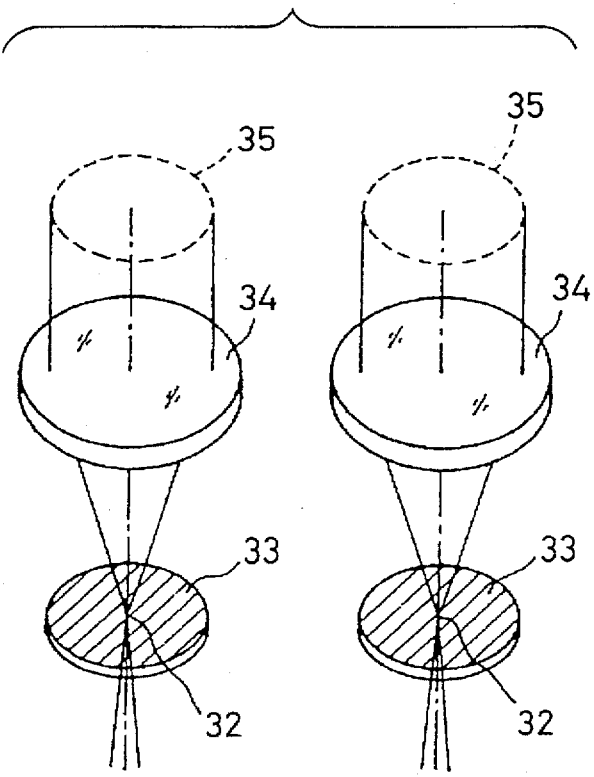
FIG. 6 shows a perspective view illustrating compositions of eyepiece lens system to be used in the first embodiment of the present invention.

Usable as the transmission type light diffusing devices 33 in the first embodiment are optical elements which utilize diffraction of light such as the micro lens array illustrated in FIG. 5. A micro lens array is composed of minute micro lenses (having a diameter of several microns) 46 which are disposed regularly on a plane parallel plate, and a distance as measured from a peak of a micro lens to a peak of a peak adjacent thereto is defined as "pitch". Since shapes of light distributions (sectional shapes of light bundles) to be obtained by passing light bundles through micro lens arrays can be optionally adjusted by using micro lens arrays which have different pitches and rows of micro lenses and surfaces on which the micro lenses are disposed can be smoothened, micro lens arrays can have diffusing surfaces which have roughness remarkably less than that on other transmission type light diffusing devices such as ground glass. Accordingly, the micro lens arrays can eliminate a feeling of roughness unwanted for observation and provide favorable images to observers.

When micro lenses are to be disposed so as to form an array in a shape of a rectangular lattice, it is possible, by selecting a pitch P which satisfies the formula shown below, to allow ununiformity in light intensity distribution to be rarely produced in an enlarged exit pupil:

$$\frac{540 \text{ nm}}{\left\{ \sin\left(\tan^{-1}\left[\frac{AS_{max}}{f_{B1}}\right]\right) \right\}} \leq P \leq 100 \,\mu\text{m} \quad (22)$$

When micro lenses are to be disposed so as to form an array in a shape of a hexagonal lattice, it is possible, by selecting a pitch P' which satisfies the formula (23) shown below, to allow ununiformity in light intensity distribution to be rarely produced in an enlarged exit pupil:

$$\frac{540 \text{ nm}}{\left\{ \sin\left(\tan^{-1}\left[\frac{AS_{max}}{f_{B1}}\right]\right)\cos 30° \right\}} \leq P' \leq 100 \,\mu\text{m} \quad (23)$$

In the formulae (22) and (23) mentioned above, the reference symbol $AS_{max}$ represents a diameter of an aperture stop, in an open condition thereof, which is used in a stereoscopic microscope of interest and the reference symbol $f_{B1}$ designates a focal length of an imaging lens which is disposed in an eyepiece lens system of interest.

Moreover, a pair of micro lens arrays which are disposed so as to have diffusing surfaces opposed to each other are usable as a micro lens array. A micro lens array which has a composition described above, or consists of two micro lens arrays, is equivalent in function thereof to a micro lens array which is composed by disposing micro lenses at random on a single plane parallel plate and therefore serves for allowing ununiformity of light intensity distribution to be produced more rarely in an enlarged exit pupil.

Also usable as the transmission type light diffusing device in the first embodiment of the present invention is a beam shaping diffuser which is manufactured and offered for sale by P.O.C. (Physical Optics Corporation) in the United States. The beam shaping diffuser is a plane parallel plate which is made of polycarbonate or acrylic material and has a diffusing surface formed so as to diffuse light within a specific range by utilizing refraction of light, and is capable of optionally shaping a light bundle passing therethrough. The beam shaping diffuser has an additional excellent characteristic of high transmittance.

In addition, the beam shaping diffuser which utilizes the refraction of light allows ununiformity in color distribution to be produced less frequently than the micro lens array which utilizes the diffraction of light. Accordingly, the beam shaping diffuser serves for forming an enlarged exit pupil free from ununiformity in color and providing bright images which are unwantedly colored for observation.

Figure 7:
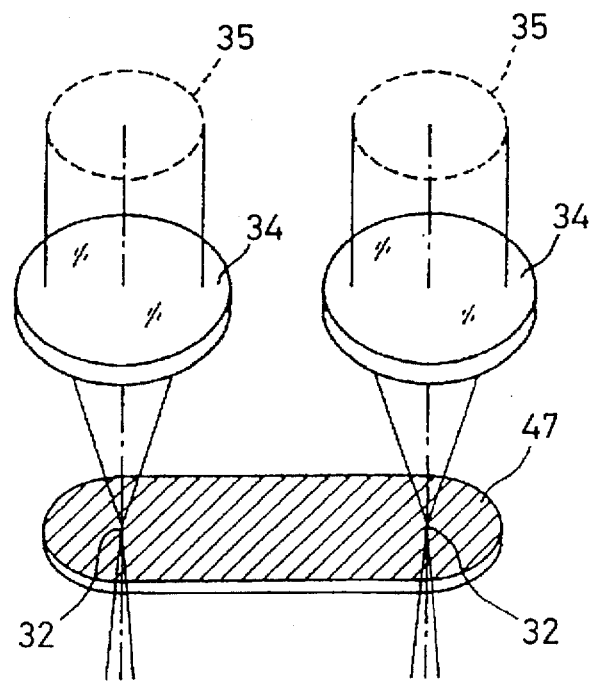
FIG. 7 shows a perspective view illustrating a modification example of the transmission type light diffusing device.

Though the transmission type light diffusing devices are disposed in the vicinities of the aerial images which are formed independently at the locations different from each other as shown in FIG. 7 in the first embodiment, it is possible to configure these diffusing devices as a single elongated transmission type light diffusing device 47 which covers the vicinities of the locations 32 of the right and left aerial images.

Though the transmission type light diffusing devices 33 are disposed in the vicinities of the locations of the aerial images which are selected before the eyepiece lens components 34 in the first embodiment, it is necessary to dispose the transmission type light diffusing devices in the vicinities of locations of the aerial images which are selected in eyepiece lens components when the stereoscopic microscope according to the present invention adopts inner-focus type eyepiece lens systems.

Figure 8:
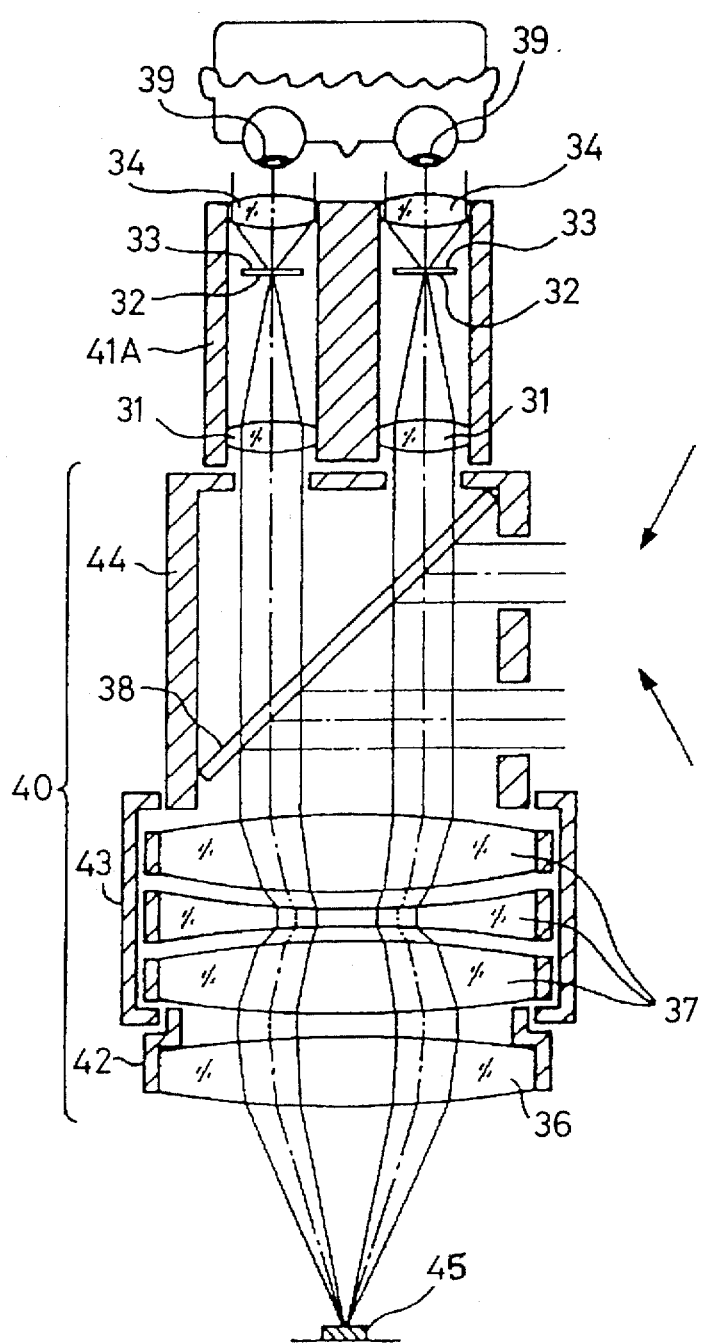
FIG. 8 and FIG. 9 show sectional views and perspective views respectively illustrating a composition of a second embodiment of the present invention.
Figure 9:
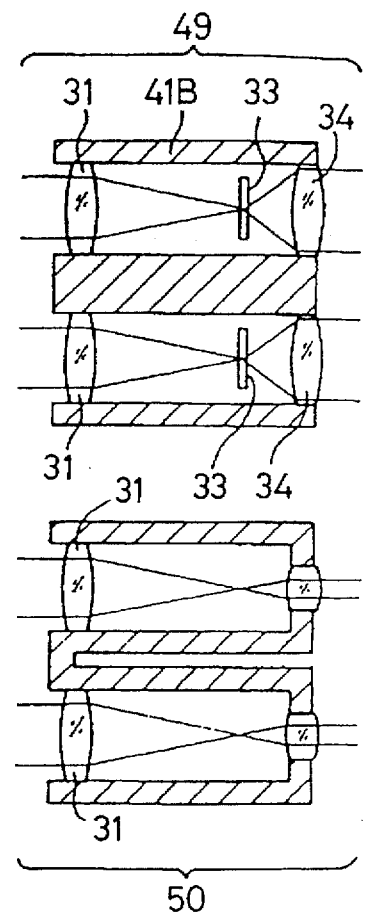

FIG. 8 and FIG. 9 illustrate a second embodiment of the stereoscopic microscope according to the present invention. In the second embodiment, optical systems disposed in an eyepiece body ranging from imaging lenses 31 to eyepiece lens systems 34 including a transmission type light diffusing device 33 is configured as a single unit 49 which is attachable and detachable to and from a microscope body 40. When the stereoscopic microscope is composed as described above, it permits replacing the unit 49 with an eyepiece body unit 50 for the ordinary surgical microscope so that an observer can observe through the ordinary eyepiece body without exchanging the stereoscopic microscope with a surginal microscope when he does not require the eyepiece body having enlarged exit pupils for observation.

An effect which is similar to that of the second embodiment can be obtained by configuring the transmission type light diffusing devices 33 and the eyepiece lens systems 34 as a single unit, and attaching and detaching this unit to and from the microscope body housing 40 in place of the eyepiece body housing 41.

Figure 10:
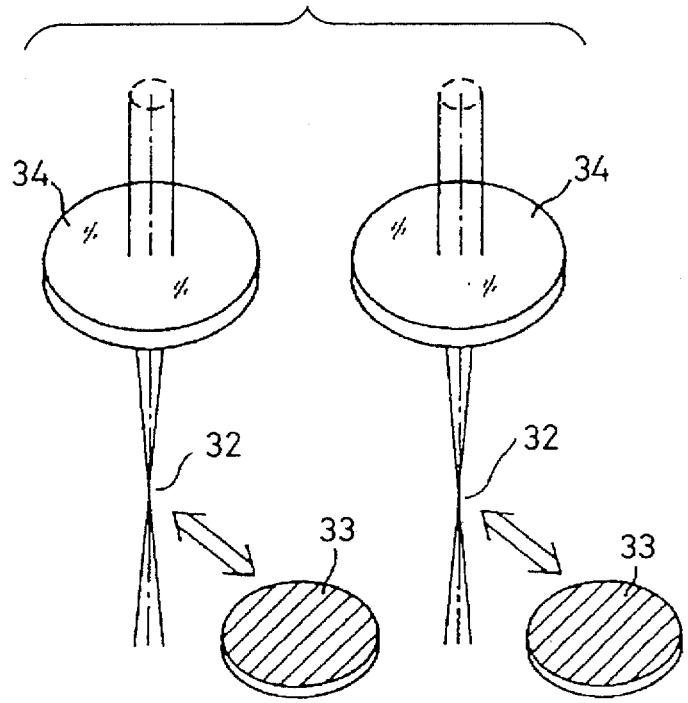
FIG. 10 shows a perspective view illustrating a composition of an third embodiment of the present invention.

FIG. 10 shows a third embodiment of the stereoscopic microscope according to the present invention. In the third embodiment, transmission type light diffusing devices 33 which are disposed in the vicinities of aerial images 32 formed independently at locations different from each other are composed so as to be movable, freely attachable and detachable. The third embodiment which is composed as described above allows observers to perform observations in two modes: one for observation with exit pupils enlarged for lessening fatigue, and the other for the normal observation without enlarging the exit pupil; while switching these modes easily and optionally.

Figure 11:
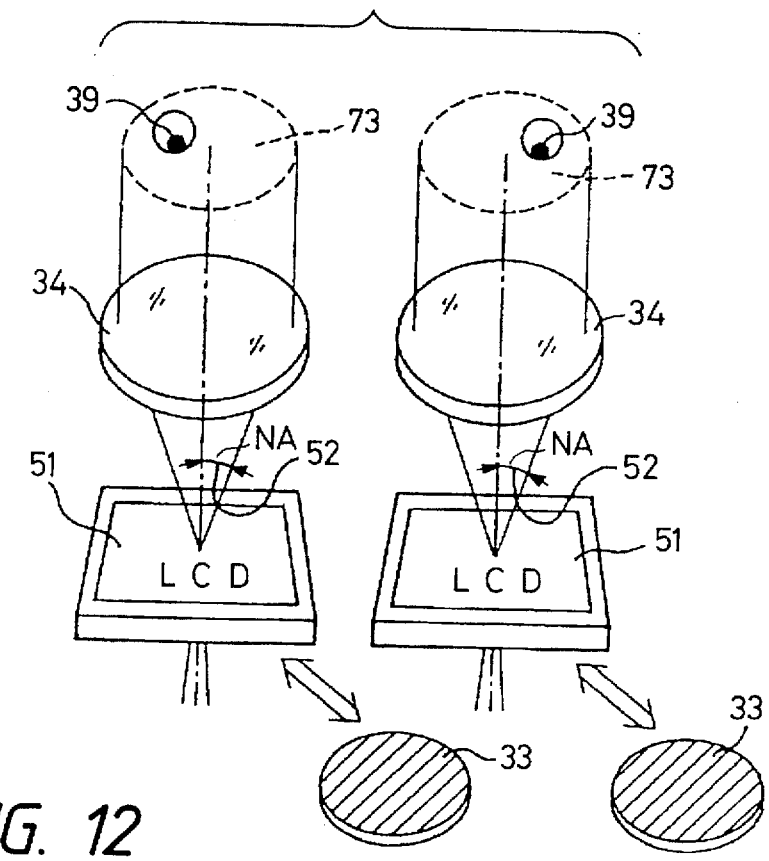
FIG. 11 shows a perspective view illustrating a composition of a fourth embodiment of the present invention.

FIG. 11 illustrates a fourth embodiment of the stereoscopic microscope according to the present invention. The fourth embodiment is configured so as to permit moving transmission type light diffusing devices 33 and swithcing the transmission type light diffusing devices 33 to liquid crystal monitors 51. The fourth embodiment permits observers easy and optional selection between magnified observation of microscopic images with exit pupils enlarged for lessening fatigue and magnified observation of electronic images formed on the liquid crystal monitors 51.

Figure 12:
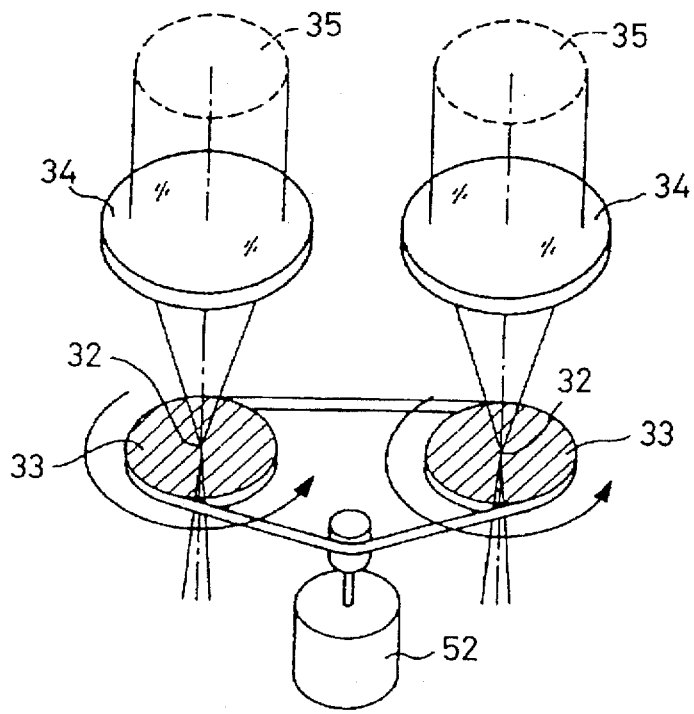
FIG. 12 shows a sectional view illustrating a composition of a fifth embodiment of the present invention.

Shown in FIG. 12 is a fifth embodiment of the stereoscopic microscope according to the present invention. This embodiment is configured so as to allow transmission type light diffusing devices 33 to be rotated at a high speed without moving axial lines thereof. The transmission tye light diffusing devices 33 are rotatingly driven by a motor 52 which is disposed in an eyepiece body housing.

Even when the fifth embodiment uses the transmission type light diffusing devices 33 which have roughness on the diffusing surfaces thereof, this embodiment decreases a feeling of roughness during observation owing to the high speed rotations of the transmission type light diffusing devices. An effect similar to that of the fifth embodiment can be obtained by vibrating the transmission type light diffusing devices at a high speed. In contrast to the first embodiment described above, which is apt to produce ununiformity in color in the enlarged exit pupils when it uses transmission type light diffusing devices utilizing the diffraction of light, the fifth embodiment reduces ununiformity in color owing to the high speed rotations of the transmission type light diffusing devices. Accordingly, the fifth embodiment is capable of providing images to be observed which give less feeling of roughness and are free from ununiformity in color in enlarged exit pupils.

Figure 13:
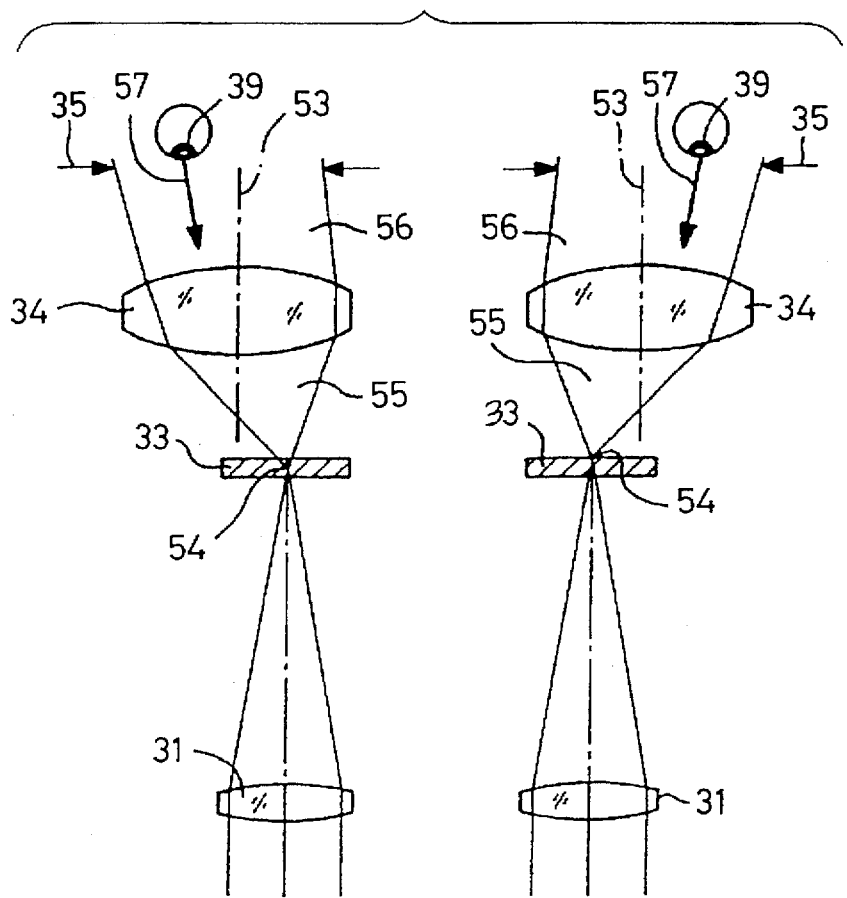
FIG. 13 shows a perspective view illustrating a composition of a sixth embodiment of the present invention.

FIG. 13 shows a sixth embodiment of the stereoscopic microscope according to the present invention. In the sixth embodiment, right and left eyepiece lens systems 34 have optical axes 53 which are shifted outward and in parallel with centers 54 of right and left aerial images formed in an observation optical system at locations closest to eyes 39 of an observer. Accordingly, light bundles emitted from the centers 54 of the right and left aerial images emerge from the right and left eyepiece lens systems 34 as light bundles 56 which are diverged outward or in directions away from each other rightward and leftward.

In the sixth embodiment, lines of vision 57 of an observer which are directed to centers of visual fields intersect with each other at a location before eyes of the observer while he keeps his pupils at any locations within enlarged exit pupils. Accordingly, the sixth embodiment allows the observer's right and left lines of vision 57 to have a vergence angle for remarkably facilitating fusion of the images when he attempts to fuse the right and left images having parallax for stereoscopic observation.

Even when the transmission type light diffusing devices are replaced with liquid crystal monitors, the sixth embodiment can provide a similar effect since it permits shifting the optical axes 53 of the right and left eyepiece lens systems 34 outward, or rightward and leftward relatively to the centers of the liquid crystal monitors.

Figure 14:
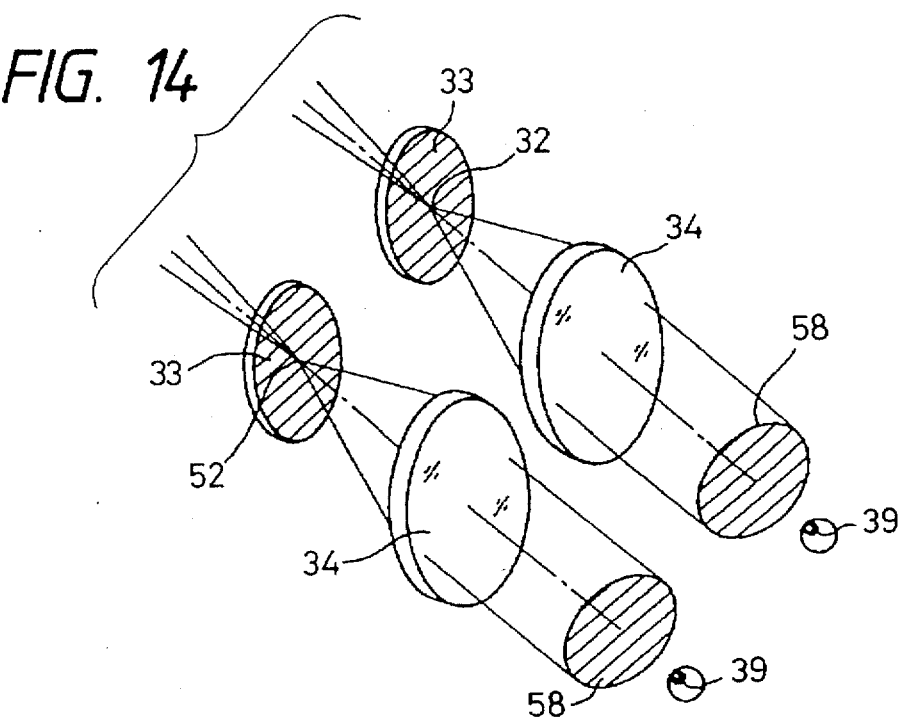
FIG. 14 shows a perspective view illustrating a composition of a seventh embodiment of the present invention.

Shown in FIG. 14, is a seventh embodiment of the stereoscopic microscope according to the present invention. In the seventh embodiment, transmission type light diffusing devices (micro lens arrays) 33 are disposed so that light bundles having passed through these devices will have an elliptic shape of light distribution (diverged condition of the light bundles) or diverged light bundles will have an elliptic sectional shape which has a major axis in the horizontal direction. The seventh embodiment forms elliptically enlarged exit pupils 58 since the light bundles having passed through the transmission type light diffusing devices are diverged and received by the eyepiece lens systems 34 in a condition where they have the elliptic light distribution.

The elliptically enlarged exit pupils 58 have major axes which are set in the horizontal direction and a length of at least 15 mm for covering a variable range of inner-pupil distances of man. Further, the enlarged exit pupils have minor axes of a certain length. The seventh embodiment which has the composition described above permits observing images free from eclipses in spite of the observer's inter-pupil distance adjustment.

Figure 15:
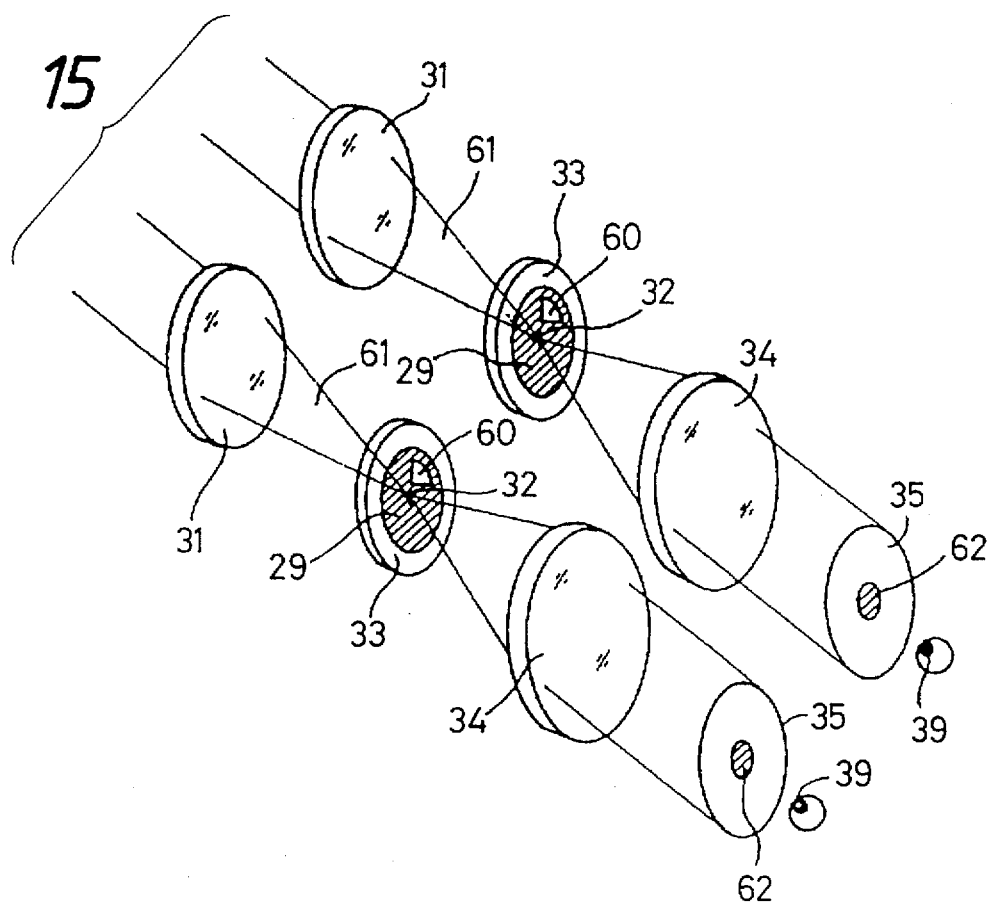
FIG. 15 shows a perspective view illustrating a composition of a eighth embodiment of the present invention.

FIG. 15 illustrates an eighth embodiment of the stereoscopic microscope according to the present invention. In the eighth embodiment, formed on portions of transmission type light diffusing devices 33 are transmitting surfaces 60 so that they are overlapped with aerial images 59 formed on the transmission type light diffusing devices 33. Portions of light bundles which emerge from imaging lenses 31 and pass through the transmitting surfaces 60 transmit through eyepiece lens systems 34 without being diverged, unlike the rest portions of the light bundles which have passed through diffusing surfaces, and form exit pupils 62 which are not enlarged. These exit pupils 62 which are not enlarged are formed at locations which are the same as those of enlarged exit pupils 35 formed by the rest portions having passed through the eyepiece lens systems 34 and at centers of the enlarged exit pupils 35.

Description will be made of what images are observed by an observer. Only while the observer keeps his pupils 39 on the exit pupils 62 which are not enlarged at the centers of the enlarged exit pupils 35, can the observer see portions of images overlapped with the transmitting surfaces 60 and images overlapped with the diffusing surfaces of the transmission type light diffusing devices 33. While the observer's pupils 39 are located in the enlarged exit pupils 35 but not on the exit pupils 62 which are not enlarged, the observer can see the images overlapped with the diffusing surfaces of the transmission type light diffusing devices, but the portions of the images overlapped with the transmitting surfaces 60 are invisible to the observer. Accordingly, the eighth embodiment permits the observer to confirm whether or not his pupils are located at the centers of the enlarged exit pupils.

Figure 16:
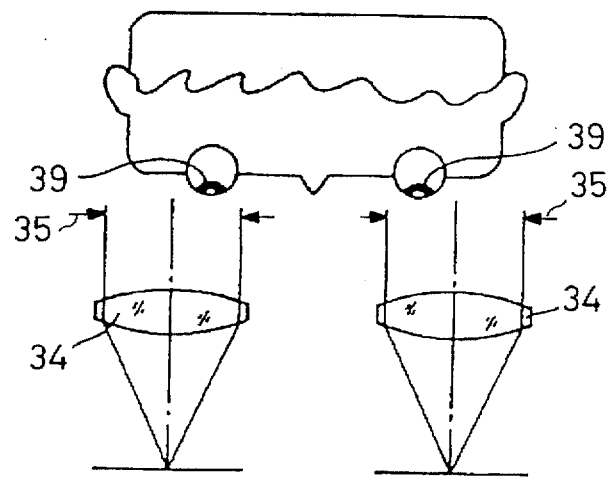
FIG. 16 shows a sectional view illustrating positional relationship between an observer's inter-pupil distance and exit pupils.
Figure 17:
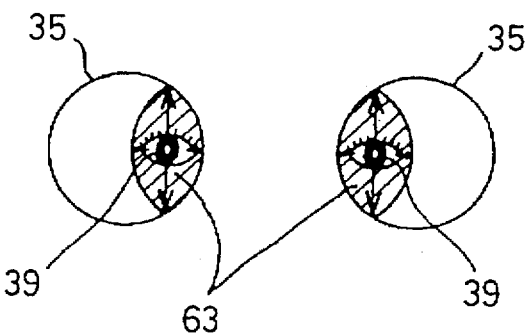
FIG. 17 shows a sectional view illustrating locations of the observer's eyes in the exit pupils.
Figure 18:
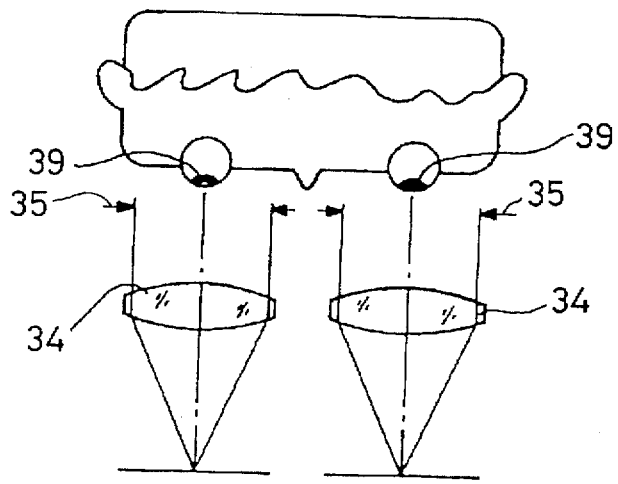
FIG. 18 shows a sectional view illustrating positional relationship between the observer's eyes and the exit pupils in the eighth embodiment.

A stereoscopic microscope which permtis the inter-pupil distance adjustment and has large pupils allows an observer to observe images free from eclipse owing to exit pupils which are large as shown in FIG. 16 even while the inter-pupil distance adjustment is more or less improper, whereby this microscope may allow the observer to mistake that his inter-pupil distance is properly adjusted in this condition. In this condition, the observer is allowed to swing his head so far as his pupils are located within slashed ranges shown in FIG. 17 and he utilizes only portions of the enlarged exit pupils 35. In contrast, the eighth embodiment of the present invention which permits the confirmation described above allows the observer to adjust his inter-pupil distance so that his pupils are always located at the center of the enlarged exit pupils 35.

Figure 19:
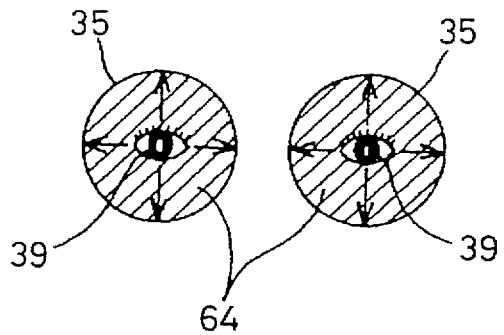
FIG. 19 a shows sectional view illustrating locations of the observer's eyes in the exit pupils in the eighth embodiment.

Accordingly, the eighth embodiment of the present invention which guides the observer to locate his pupils 39 always at the centers of the enlarged exit pupils 35 allows the observer to swing his head so far as his pupils are located within the slashed regin 64 in FIG. 19 and fully utilize the overall ranges of the enlarged exit pupils 35. As a result, the enlargement of the exit pupils makes it possible for the observer to observe images free from eclipses regardless of swinging of his head.

Figure 20:
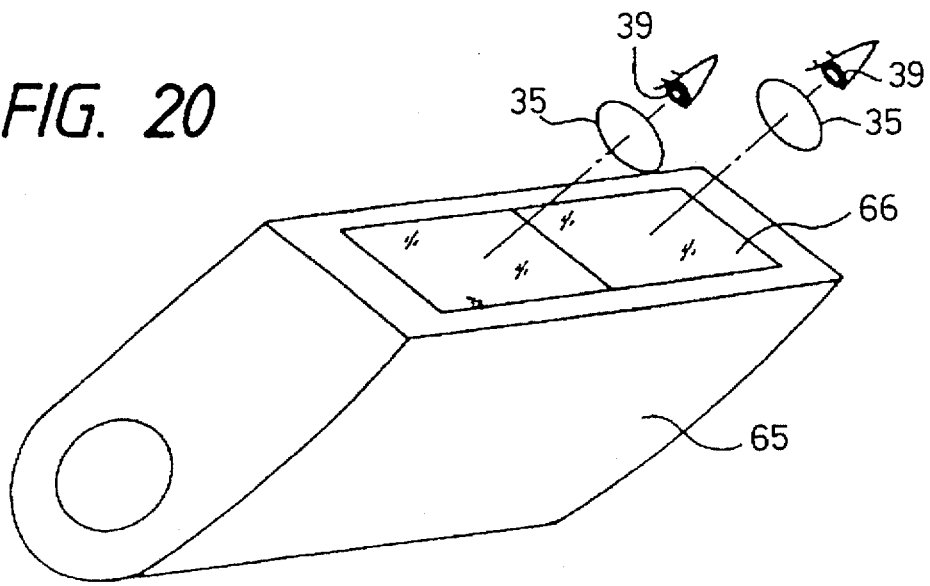
FIG. 20 shows a perspective view illustrating an eyepiece body used in a ninth embodiment of the present invention.

FIG. 20 illustrates a nineth embodiment of the stereoscopic microscope according to the present invention. In the nineth embodiment, a section 66 of an eyepieces body 65 is not divided into two independent portions, but lens components which are closest to the observer's eyes, out of lens components disposed in the eyepiece body, are formed so as to have a diameter of 40 mm, and sections near which the observer is to bring his right and left eyes are continuous to each other on a plane. The sixteenth embodiment allows the observer to feel as if no frames other than visual field frames are given to himself and concentrate his attention only on work such as surgical operation.

Figure 21:
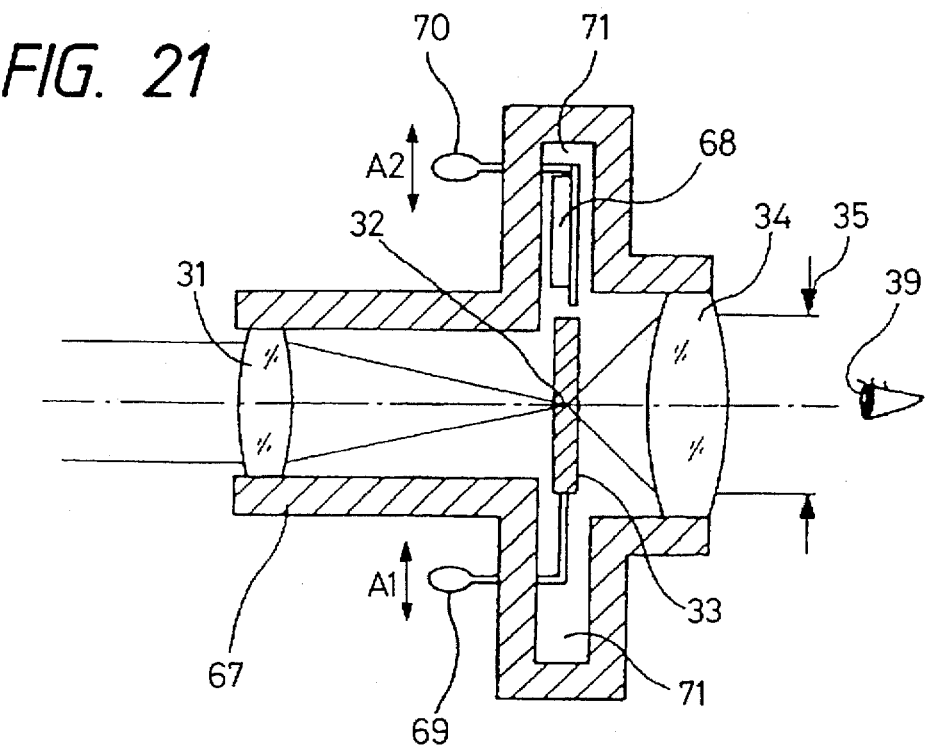
FIG. 21 shows a sectional view partially illustrating a composition of a tenth embodiment of the present invention.

Shown in FIG. 21 is a tenth embodiment of the stereoscopic microscope according to the present invention. In the tenth embodiment, disposed in an eyepiece body housing 67 of a surgical microscope are mechanisms for sliding a transmission type light diffusing device 33 and a liquid crystal monitor 68 respectively. Speaking concretely, the transmission type light diffusing device 33 can be slided in a direction A1 by moving a knob 69 in the direction A1, whereas the liquid crystal monitor 68 can be slided in a direction A2 by moving a knob 70 in the direction A2. The seventeenth embodiment which has the configuration described above allows an observer to move the transmission type light diffusing device 33 or the liquid crystal monitor 68 from a location 71 which is other than a location 32 of an aerial image to the location 32.

Further, an eyepiece lens system 34 used in the tenth embodiment is an eyepiece lens system for microscopes which has an enlarged exit pupil and optical performance high enough to provide an image favorable for observation so far as the observer locates his pupil at any position within the enlarged exit pupil.

The tenth embodiment allows the observer to optionally select a microscopic image or an electronic image formed on the liquid crystal monitor by manipulating the sliding mechanism 69 or 70 disposed in the eyepiece body. Further, since a numerical aperture 52 of a light bundle coming from the liquid crystal monitor 51 is large to some extent as shown in FIG. 11, an exit pupil 73 of the eyepiece lens system 34 is enlarged upon switching from observation of the microscopic image to observation of the electronic image. The tenth embodiment, in which the eyepiece lens system 34 has optical performance preliminarily set as described above, requires no preparation of a separate eyepiece lens system and permits the observer to favorably observe the electronic image formed on the liquid crystal monitor 51 so far as he locates his pupil 39 at any position within the enlarged exit pupil 73. The seventeenth embodiment thus allows the observer to perform favorable observations of both the microscopic image and the electronic image by using the single eyepiece body.

In addition, component members which are used in the second through tenth embodiments and not described above in particular are the same as those described with reference to the first embodiment.

Figure 22:
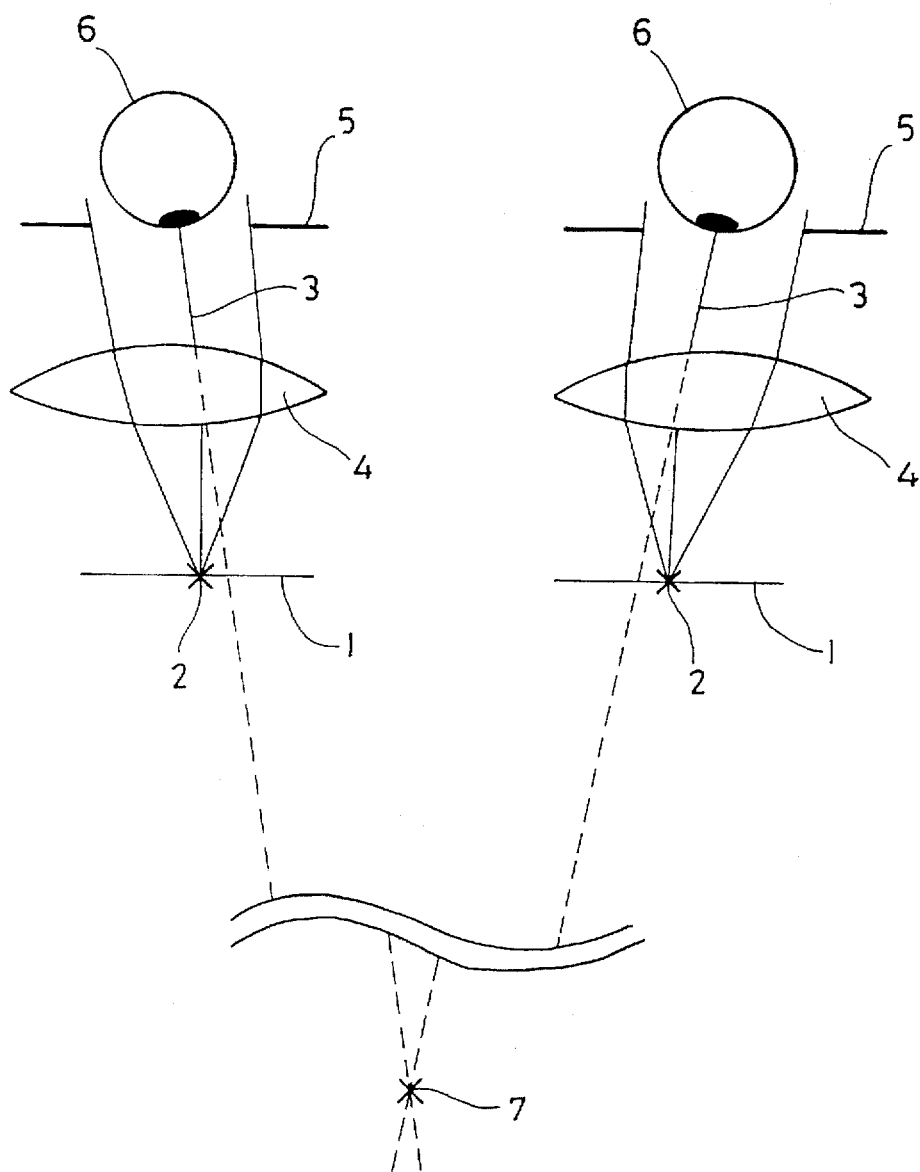
FIG. 22 shows a sectional view illustrating a fundamental configuration of the stereoscopic microscope according to the present invention.

The stereoscopic microscope according to the present invention is configured, as shown in FIG. 22, so that rays 3 and 3 emitted from centers 2 and 2 of right and left images 1 and 1 are refracted so as to intersect with each other at a location 7 before observer's eyes 6 and 6 in a condition where the rays 3 and 3 pass through right and left eyepiece lens systems 4 and 4, thereafter being incident on pupils of the observer's eyes 6 and 6. That is to say, observer's right and left lines of vision directed to centers of visual fields are verged when the observer observes an object through the stereoscopic microscope according to the present invention. The images 1 and 1 may be ones formed by an observation optical system or ones formed on a display surface of a monitor such as a CRT which is disposed in place of the observation optical system.

By configuring a stereoscopic microscope as described above, it is possible to remarkably correct the defect of the difficulty in fusing of right and left images caused by omitting the inter-pupil distance adjustment as well as the other defects which are described with reference to FIG. 1A, FIG. 1B and FIG. 2 even when the stereoscopic microscope has exit pupils larger than the variable range of inter-pupil distances of man. Accordingly, the stereoscopic microscope according to the present invention allows all observers that have inter-pupil distances within an ordinary distribution thereof to easily fuse the right and left image in spite of the inter-pupil adjustment and perform stereoscopic observations with little fatigue during the observations.

Further, it is desirable to configure the stereoscopic microscope according to the present invention described above so as to have an exit pupil diameter of 12 mm or larger so that it requires no inter-pupil adjustment, permits observing images free from eclipses and allows images to be rarely eclipsed because of to movements of observers head.

For configuring the stereoscopic microscope according to the present invention so as to allow the observer's right and left lines of vision to be verged by inclining optical axes of right and left eyepiece lens systems, it is desirable to satisfy the following condition (1):

$$\theta > \tan^{-1} \frac{D \times |a|}{2000} \qquad (1)$$

wherein the reference symbol θ represents an outward inclination angle of right and left eyepiece lens systems, and the reference symbols D and a designate an exit pupil diameter and diopter respectively of the eyepiece lens systems.

The right side of the condition (1) is equal to the left side thereof when the observer's right and left lines of vision directed to centers of visual fields are parallel to each other in a condition where the observer's right and left pupils are located at innermost positions in exit pupils as shown in FIG. 1A or in another condition where the observer's right and left pupils are located at outermost positions in the exit pupils as shown in FIG. 1B. When the inclination angle θ has a value which is larger than that of the right side of the condition (1), the observer's right and left lines of vision directed to the centers of the visual fields are inclined inward, or the lines of vision directed to the centers of the right and left visual fields are verged.

When the stereoscopic microscope according to the present invention is configured so as to satisfy the condition (1), it allows all the observers to easily fuse right and left images in spite of his inter-pupil distance adjustment, slightly move their heads for observing images free from eclipses and perform stereoscopic observation with little fatigue.

The stereoscopic microscope according to the present invention can comprise a monitor which enlarges exit pupils of light bundles coming from images formed thereon and diffusing plates which are disposed at locations of images for enlarging exit pupils of light bundles coming therefrom or a similar device.

Even when observers have weak visual powers, their visual powers are corrected to a similar level so long as they use spectacles or contact lenses. Accordingly, no problem is posed in most cases by imparting no function of diopter adjustment to eyepiece lens systems. Taking this point into consideration, no problem is posed by omitting the function of diopter adjustment from the eyepiece lens systems and setting diopter of the eyepiece lens systems at a fixed value within a range from −6 dioptry to 0 dioptry. Though a dioptry value within a range from −2 dioptry to 0 dioptry is more preferable, it is practically sufficient to select a fixed dioptry value within the above-mentioned range from −6 dioptry to 0 dioptry. For obtaining eyepiece lens systems having such a dioptry value, it is desirable to configure lens systems so as to satisfy the following condition (2):

$$2.1° < \theta' < 8.2° \qquad (2)$$

wherein the reference symbol θ' represents an outward inclination angle of the eyepiece lens systems.

For accomplishing the objects of the present invention, the stereoscopic microscope according to the present invention is configured so that observer's lines of vision which are directed to the centers of the images are not outward, or rays which are emitted from the centers of the images and to reach the observer's eyes after having passed through the right and left eyepiece lens components are directed outward. Accordingly, it is sufficient to select a value of θ' which is a little larger than 0° when diopter of the eyepiece lens systems is to be fixed at 0 dioptry. Even when the eyepiece lens systems have a dioptry values which is fixed at 0 dioptry, however, observations are facilitated by slightly inclining inward the observer's lines of vision (slightly inclining outward the rays which are to reach the observer's eyes). It is therefore desirable that θ' is actually larger than the lower limit of the condition (2) mentioned above.

Once diopter and a pupil diameter are determined, a minimum value of the inclination angle θ can be calculated by using the condition (1). When the condition (1) gives a minimum value of θ which is smaller than the lower limit of 2.1° of the condition (2), it is sufficient to select an adequate value within the range from 2.1° to 8.2° defined by the condition (2). When the condition (1) gives a minimum value which is larger than 2.1°, it is proper to select an adequate value between the calculated minimum value and the upper limit of 8.2° of the condition (2).

If the lower limit of the condition (2) is exceeded, it is impossible to sufficiently correct the defects illustrated in FIG. 1A and FIG. 1B. If the upper limit of the condition (2) is exceeded, in contrast, the point of intersection between the lines of vision directed to the centers of the right and left visual fields will be closer to observer's eyes than a nearest point of his clear observation range which is located at 250 mm as measured from his eyes and largely distant from focus point of the observer's eyes, thereby hindering clear observations of images.

Figure 25:
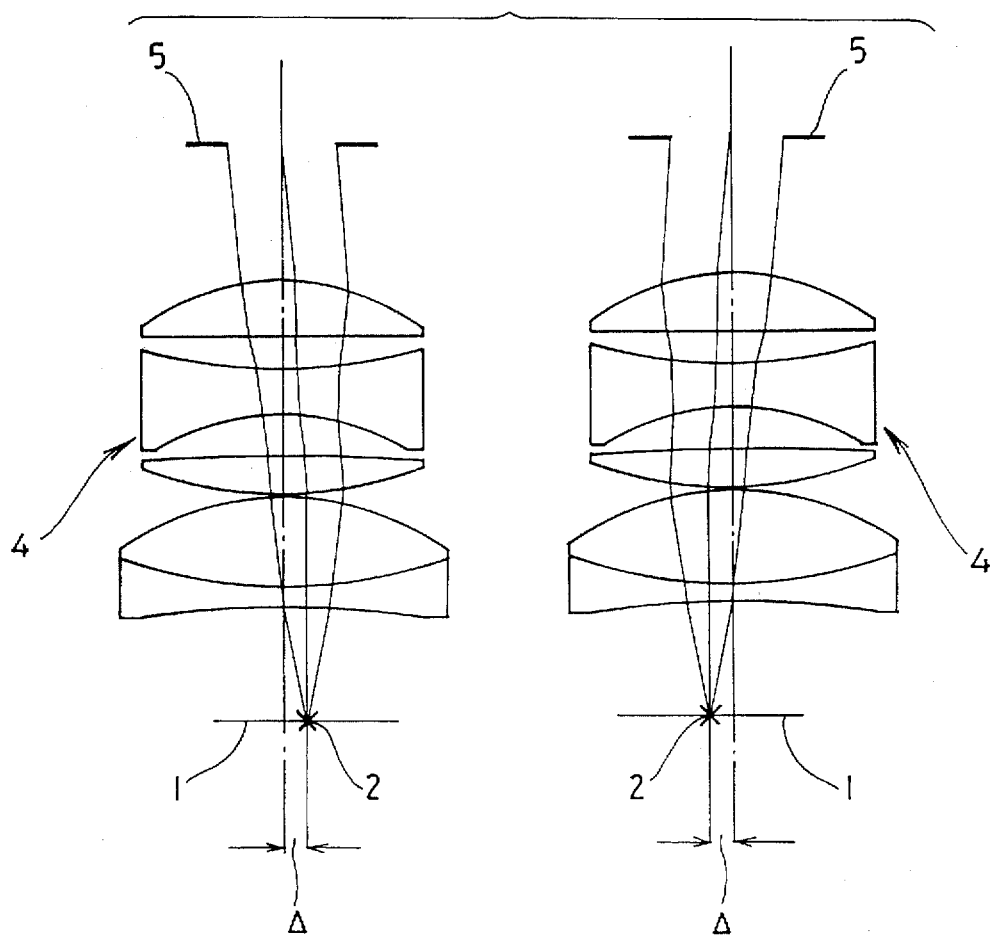
FIG. 25 shows a sectional view illustrating a composition of a twelfth embodiment of the present invention.

Furthermore, the stereoscopic microscope according to the present invention allows the observer to verge his right and left lines of vision also by parallel shifting the optical axes of the eyepiece lens systems outward, or rightward and leftward relatively to the centers of the images as shown in FIG. 25.

For verging the right and left lines of vision by the parallel shift, it is desirable to move the optical axes of the eyepiece lens systems so that a moving distance (a degree of eccentricity) Δ of the optical axes satisfies the following condition (3):

$$\Delta > f \times D \times |a|/2000 \qquad (3)$$

wherein the reference symbol f represents a focal length of the eyepiece lens systems.

The above-mentioned condition (3) is required for verging the lines of vision which are directed to the centers of the right and left visual fields by increasing the degree of eccentricity. When the condition (3) is satisfied, the stereoscopic microscope allows all observers that have inter-pupil distances within the ordinary distribution range thereof to easily fuse right and left images, observe images free from eclipses in spite of movements of their heads and perform stereoscopic observations with little fatigue.

In the case where the stereoscopic microscope according to the present invention is configured so as to allow the vergence of the observer's lines of vision, it can comprise a monitor which enlarges exit pupils of light bundles coming from images formed thereon, diffusing plates which are disposed at locations of images for enlarging pupils of light bundles coming therefrom or a similar device.

When the stereoscopic microscope according to the present invention is configured so as to allow the parallel shift of the optical axes of the eyepiece lens systems and the operation for diopter adjustment is to be omitted by setting diopter of the eyepiece lens systems within the range from −6 dioptry to 0 dioptry, it is desirable to select a degree of eccentricity Δ' within a range defined by the following condition (4):

$$0.03f < \Delta' < 0.14f \quad (4)$$

If the lower limit of the condition (4) is exceeded, it will be difficult to obtain the effect for solving the problems illustrated in FIG. 1A and FIG. 1B. If the upper limit of the condition (4) is exceeded, in contrast, the point of intersection between the lines of vision directed to the centers of the right and left visual fields will be closer to the observer's eyes than the nearest point of his clear observation range, and the focus point of the observer's eyes will be largely different from locations of images, thereby hindering clear observations. A concept similar to that described with reference to the condition (2) is applicable to the lower limit of the condition (4). Speaking concretely, it is proper to select, for the degree of eccentricity, an adequate value between 0.03 f and 0.14 f when the right side of the condition (3) gives a value of the lower limit of the condition (4) which is smaller than 0.03 f. When the condition (3) gives a value of the lower limit of the condition (4) which is larger than 0.03 f, it is proper to select a value between the calculated value and 0.14 f. Such a concept is to apply also to each of the upper limit of the conditions (5) and (6) as well as the lower limits of the conditions (7) and (8) which are to be described later.

When the stereoscopic microscope according to the present invention is configured so as to satisfy the condition (4), it allows all observers that have inter-pupil distances within the ordinary distribution range thereof to easily fuse right and left images in spite of the inter-pupil distance adjustment and the diopter adjustment, observe images free from eclipses in spite of slight movements of their heads and perform stereoscopic observations with little fatigue.

Figure 26:
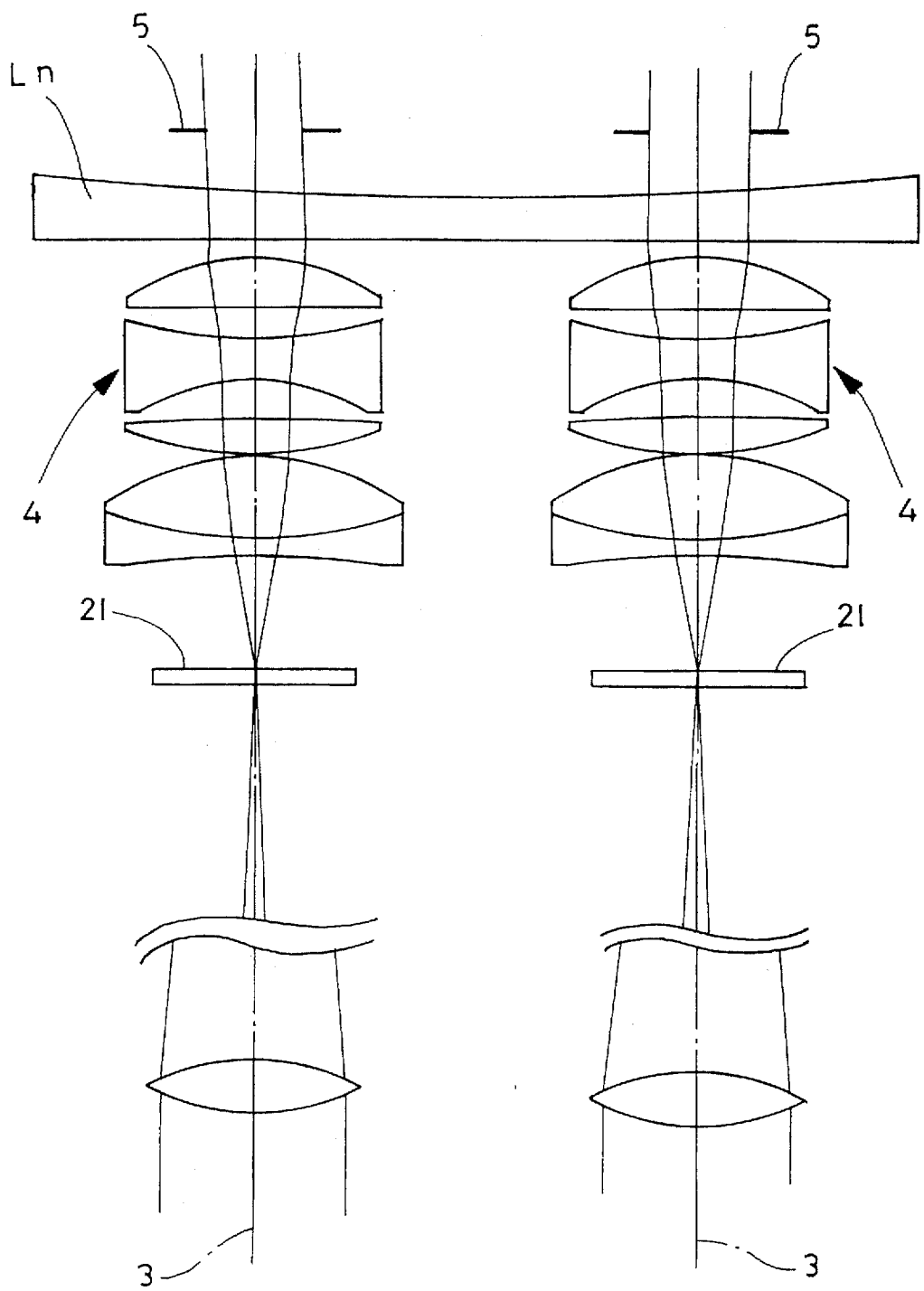
FIG. 26 shows a sectional view illustrating a composition of a thirteenth embodiment of the present invention.

The objects of the present invention can be accomplished also by equipping the stereoscopic microscope according to the present invention with a concave lens component which is disposed over the eyepiece lens systems (between the eyepiece lens systems and eyes of an observer to observe through the microscope) as shown in FIG. 26. When a pair of right and left eyepiece lens systems are disposed so as to have optical axes in parallel to each other and a concave lens component is placed over these eyepiece lens systems on the side of the observer's eyes, rays emitted from the centers of the images are refracted outward or rightward and leftward by the concave lens component, whereby observer's lines of vision directed to the centers of the visual fields are allowed to be verged and the observer is allowed to fuse right and left images for facilitating stereoscopic observation. When the right and left eyepiece lens systems are disposed so as to have optical axes in parallel to each other as described above, they are free from mutual interference and can be configured to be compact. For configuring the stereoscopic microscope compactly, it is desirable to cut off portions of the concave lens component which are unnucessary for transmission of light bundles so that it is narrower in a vertical width thereof.

In case of the stereoscopic microscope wherein outward or rightward and leftward refracting directions for light bundles which emerge from the right and left eyepiece lens systems are determined dependently on a focal length fn of the concave lens component to be disposed over the eyepiece lens systems, it is desirable to select, for the concave lens component, a focal length $f_n$ which satisfies the following condition (5):

$$f_n < \{1000 \times (De-65)\}/[De \times |a|] \quad (5)$$

Like the condition (1), the condition (5) defines a focal length of the concave lens component so that the observer's lines of vision directed to the centers of the visual fields are always verged so far as observer's pupils are located at any positions within the enlarged exit pupils. When the condition (5) is satisfied, the stereoscopic microscope according to the present invention allows all observers that have inter-pupil distances within the ordinary distribution range thereof to fuse right and left images in spite of the inter-pupil distance adjustment, observe images free from eclipses in spite of movements of their heads, and perform stereoscopic observations with little fatigue as in the case where the condition (1) is satisfied.

When the diopter adjustment is to be omitted by setting diopter of the eyepiece lens systems at a fixed value within the range from −6 dioptry to 0 dioptry as described above, it is preferable to satisfy the condition (6) shown below:

$$-790 \text{ mm} < f_n' < -180 \text{ mm} \quad (6)$$

When the condition (6) is satisfied, the observer's right and left lines of vision directed to the centers of the visual fields are always verged so far as observer's pupils are located at any positions within the enlarged exit pupils.

If the lower limit of the condition (6) is exceeded, the stereoscopic microscope will have the defects which have been described with reference to FIG. 1A and FIG. 1B. If the upper limit of the condition (6) is exceeded, the point of intersection between the lines of vision directed to the centers of the visual fields is closer to the observer's eyes than the nearest point of his clear observation range which is located at 250 mm as measured from his eyes and largely distant from the focus point of his eyes, thereby hindering clear observations.

Figure 27:
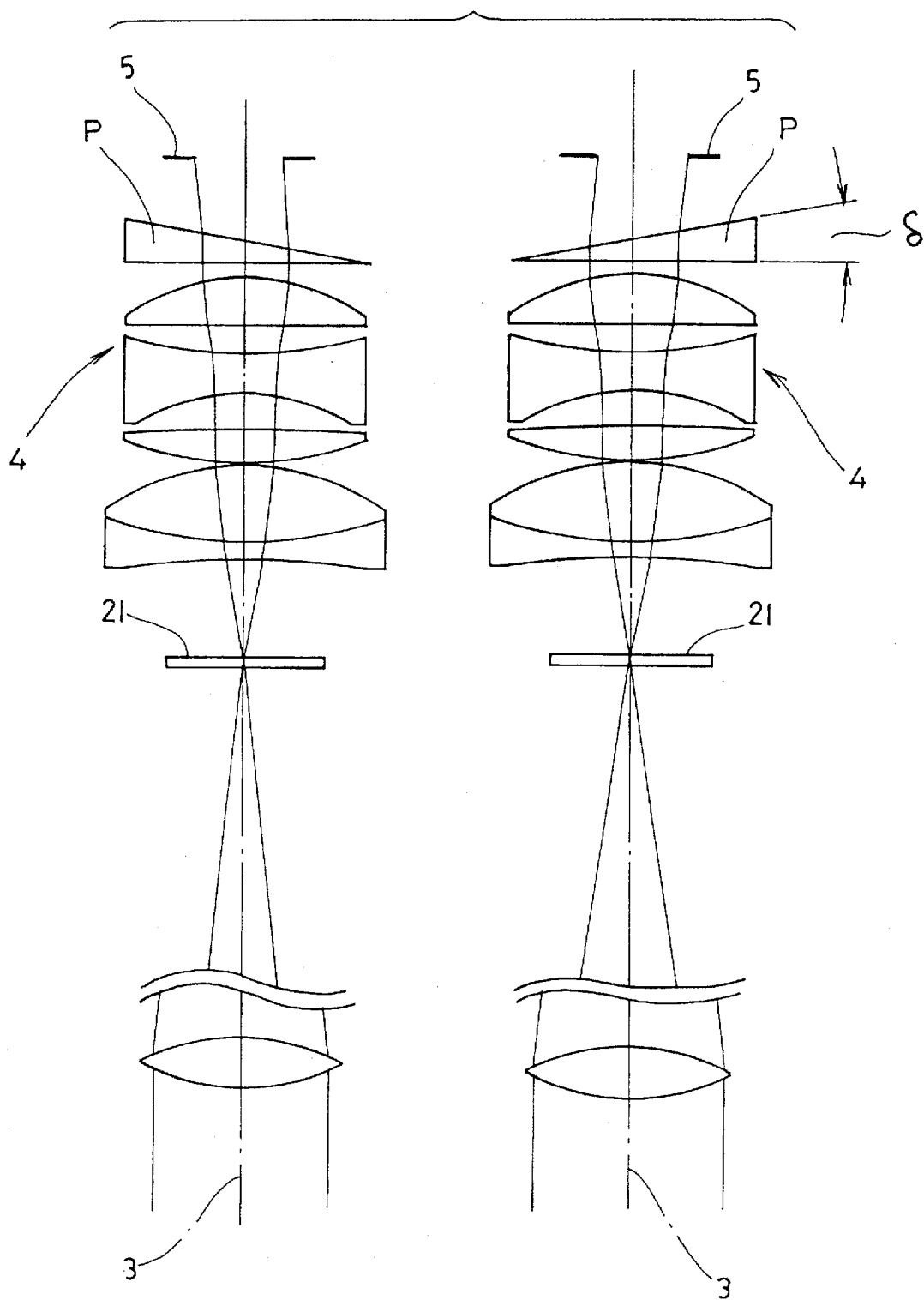
FIG. 27 shows a sectional view illustrating a composition of a fourteenth embodiment of the present invention.

An effect which is similar to that described above is available by disposing wedge-shaped prisms over the right and left eyepiece lens systems as illustrated in FIG. 27. In this case, it is desirable to configured these prisms so as to have acute angles 6 which satisfies the following condition (7):

$$\delta > \tan^{-1}[\sin\{\tan^{-1}(De \times |a|/2000)\}/\{n - \cos(\tan^{-1}(De \times |a|/2000))\}] \quad (7)$$

wherein the reference symbol n represents a refractive index of awed. ge-shaped portion of the prism.

Like the condition (1), the condition (7) is required for verging the observer's lines of vision directed to the centers of the visual fields so far as the observer's pupils are located at any positions within the enlarged exit pupils. When the condition (7) mentioned above is satisfied, the stereoscopic microscope allows all the observers that have inter-pupil distances within the ordinary distribution range thereof to easily fuse the right and left images, observe images free from eclipses in spite of slight movements of their heads and perform stereoscopic observations with little fatigue. For obtaining a maximum displacement angle, it is desirable to dispose the wedge-shaped members (prisms) so that they have surfaces of incidence on which light bundles emerging from the eyepiece lens systems will be incident perpendicularly. In a case where the prisms have a small acute angle, however, these prisms may be disposed at any positions.

In a case where the stereoscopic microscope according to the present invention uses the wedge-shaped members for obtaining the effect described above and diopter of the eyepiece lens systems is to be fixed at a value within a range from $-6$ m$^{-1}$($-6$ dioptry) to $0$ m$^{-1}$ ($0$ dioptry) for omitting the operation of the diopter adjustment, it is desirable to configure the wedge-shaped members so as to have an acute angle $\delta'$ which satisfies the following condition (8):

$$4° < \delta' < 15° \qquad (8)$$

If the lower limit of the condition (8) is exceeded, the stereoscopic microscope will have the defects described with reference to FIG. 1A and FIG. 1B. If the upper limit of the condition (8) is exceeded, in contrast, the point of intersection between the lines of vision directed to the centers of the right and left visual fields will be closer to the observer's eyes than the nearest point of the observer's clear observation range which is located at 250 mm as measured from his eyes and largely distant from the focus point of his eyes, thereby hindering clear observations.

Figure 23:
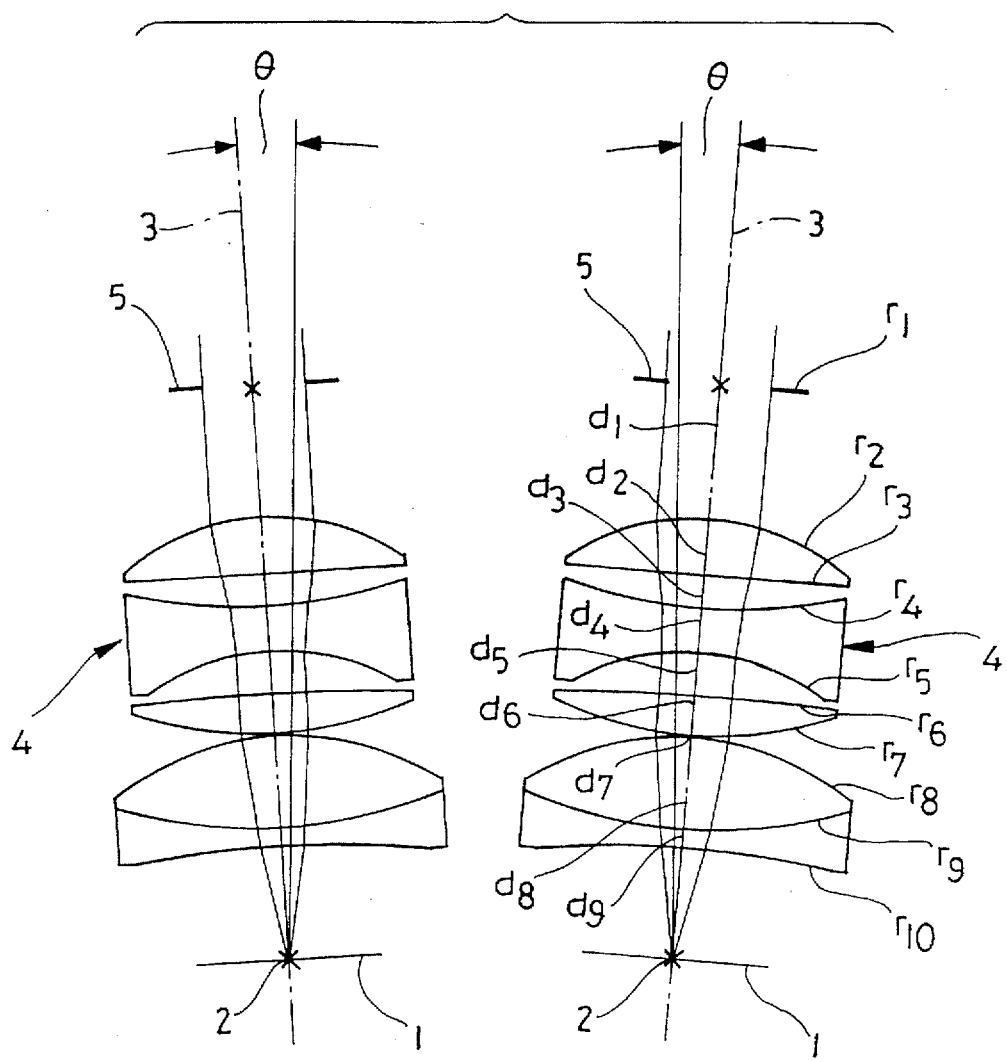
FIG. 23 shows a sectional view illustrating a composition of a eleventh embodiment of the present invention.
Figure 24:
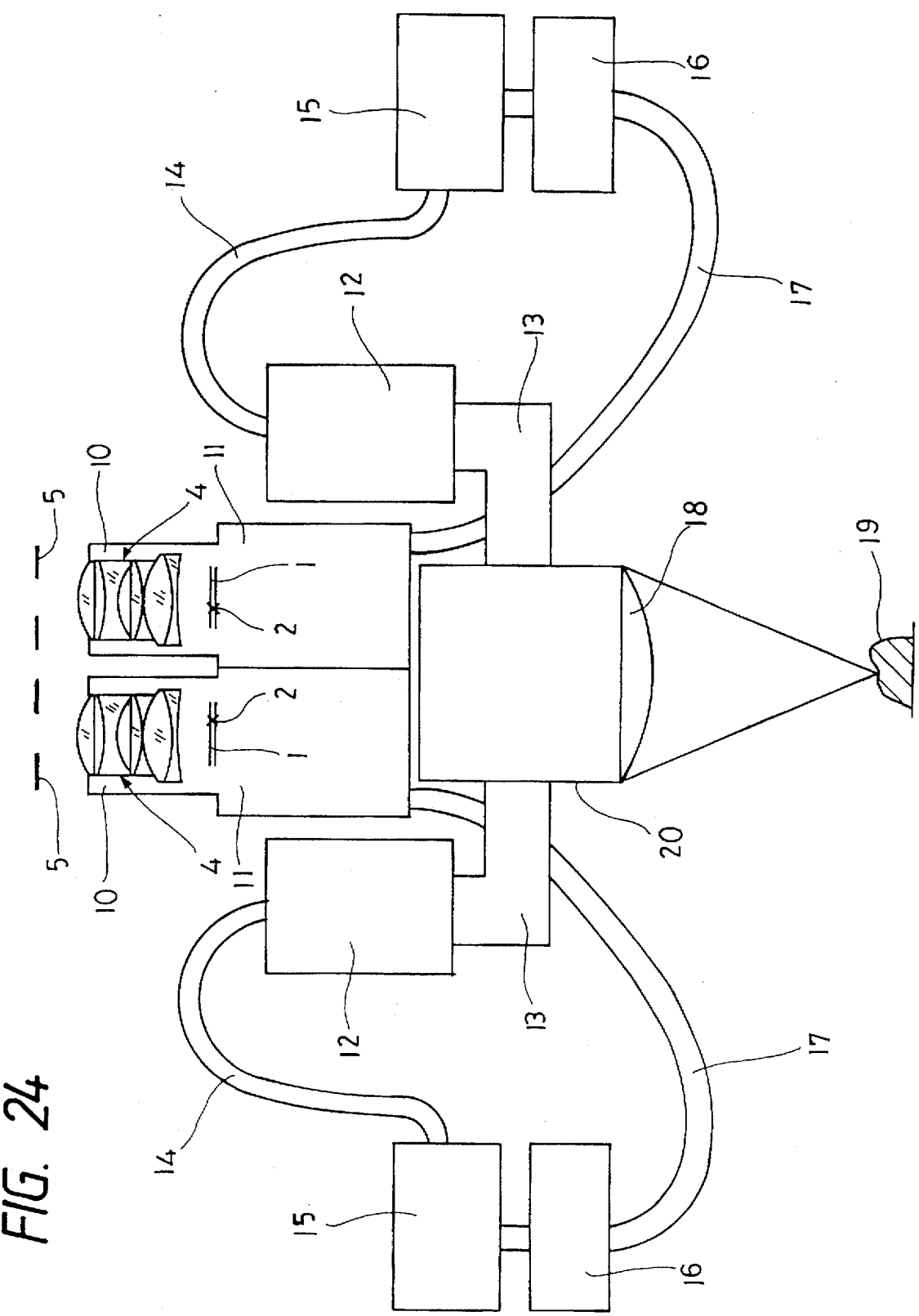
FIG. 24 shows a sectional view illustrating an overall configuration of the stereoscopic microscope according to the present invention.

Description will be made below of preferred embodiments of the stereoscopic microscope which has been described above. FIG. 23 and FIG. 24 show sectional view illustrating a composition of a eleventh embodiment of the stereoscopic microscope according to the present invention. This embodiment has the fundamental configuration of the stereoscopic microscope according to the present invention which is illustrated in FIG. 22 and allows an observer to easily fuse right and left images.

FIG. 24 shows an overall configuration of the surgical microscope. This microscope comprises a microscope body 20, two TV cameras 12 and 12 which are connected to right and left sides of the microscope body 20 by way of TV adaptors 13 and 13, and eyepiece bodies 11 and 11 mounted on the microscope body 20.

In FIG. 24 a reference numeral 19 represents an object to be observed. The microscope body 20 comprises an objective lens system 18, and right and left beam splitters which are disposed over the objective lens system 18. Rays emitted from the object 19 are transformed by the objective lens system 18 into a parallel light bundle, a portion of which is split by the beam splitters and incident on the TV adaptors 13 and 13. The TV adaptors 13 and 13 comprise imaging lenses which receive rays from the beam splitters and form two images with parallax in the TV cameras 12 and 12. These images are received by solid-state image pickup devices such as CCD image sensors disposed in the TV cameras 12 and 12, and the image pickup devices provide output signals representing the images. These output signals are provided to camera control units (CCU's) 15 and 15 through signal lines 14 and 14. The output signals are subjected to predetermined processings in the CCU's for conversion into video signals and provided to converters 16 and 16 for conversion into threefold speed RGB serial signals, which in turn are provided to image display devices built in the eyepiece bodies 11 and 11 through signal lines 17 and 17. In FIG. 24, reference numerals 1 and 1 represent image display surfaces of the image display devices, and reference numerals 2 and 2 designate centers of the image display surfaces. images of the object to be observed are formed on these surfaces. Disposed over the image display surfaces of the eyepiece bodies 11 and 11 are eyepiece lens systems 4 and 4 which are sustained in vertically movable holders 10 and 10 for composing eyepiece bodies having an exit pupil diameter of 14 mm. Reference numerals 5 and 5 denote locations of the exit pupils. In addition, the microscope body comprises vari-focal optical systems which are similar to those used in the ordinary stereoscopic microscope and form two images of the object with parallax by using the rays which are not split by the beam splitters. Accordingly, the eleventh embodiment of the stereoscopic microscope according to the present invention allows the eyepiece bodies 11 and 11 comprising the image display devices to be replaced with a binocular eyepiece body for the ordinary stereoscopic microscope, thereby enabling stereoscopic observations of optical images.

The eleventh embodiment of the stereoscopic microscope according to the present invention adopts image display devices each of which is composed of a threefold speed monochromatic CRT monitor having a size of 1.5 inches and a liquid crystal color filter disposed thereon. While receiving the threefold speed RGB signals from the converters 16 and 16, the CRT monitors sequentially display monochromatic images corresponding to R signals, G signals and B signals. The liquid crystal filters operate in synchronization with the threefold speed signals for coloring the monochromatic images. The sequential coloring of the images formed by the R, G and B signals described above makes it possible to obtain highly resolved images on small display devices. The image display surfaces have a horizontal size of 24 mm. Color liquid crystal panels, etc. which are smaller than the image display devices may be used.

FIG. 23 illustrates positional relationship between the display surfaces of the image display devices and the eyepiece lens systems. In the eleventh embodiment of the stereoscopic microscope according to the present invention, optical axes of the right and left eyepiece lens systems are inclined at an angle of $\theta$ outward or symmetrically rightward and leftward relatively to straight lines which are perpendicular to the two image display surfaces 1, 1 and in parallel to each other.

The condition (1) is satisfied by selecting outward inclination angles $\theta$ of $3°\sim2°\sim1°\sim1°$ for the right and left eyepiece lens systems in FIG. 23 when diopter of the eyepiece lens systems are to be adjusted to $-6\sim-4\sim-2\sim+2$ (dioptry). When such inclination angles are selected, rays which pass through exit pupils, out of rays emitted from centers of images, are incident on observer's eyes at angles of vergence and observer's lines of vision directed to centers of visual fields are verged so far as observer's pupils are located at any positions within exit pupils of the eyepiece lens systems, whereby the observer can easily fuse a right image with a left image and perform stereoscopic observation in spite of his diopter adjustment. The condition (2) is satisfied when diopter of the eyepiece lens systems is fixed at $-1$ dioptry and the optical axes of the eyepiece lens systems which are perpendicular to the centers of the image are inclined at 2.5° outward or rightward and leftward. Accordingly, the observer's lines of vision directed to the centers of the visual fields are verged to each other so far as the observer's eyes are located at any positions within the exit pupils of the eyepiece lens systems. As a result, the eleventh embodiment of the stereoscopic microscope according to the present invention allows all observers that have inter-pupil distances within the ordinary distribution range thereof to easily fuse images in spite of the inter-pupil adjustment and diopter adjustment, and perform stereoscopic observations with little fatigue.

FIG. 25 illustrates a twelfth embodiment of the stereoscopic microscope according to the present invention wherein right and left eyepiece lens systems are made eccentric for obtaining the effect available by the present invention, or movable outward for a distance of Δ parallel to each other. The second embodiment satisfies the condition (3) by selection for Δ values of 2 mm~1.5 mm~1 mm~1 mm for a diopter adjustable range of −6—−4—−2 ~+2 (dioptry). When the eyepiece lens systems are moved as described above, rays which have passed through exit pupils, out of rays emitted from centers of images, are incident on observer's eyes at angles with divergence and the observer's lines of vision directed to centers of visual fields are verged to each other so far as observer's pupils are located at any positions within exit pupils of the eyepiece lens systems. Accordingly, the twelfth embodiment of the stereoscopic microscope according to the present invention allows the observer to easily fuse images in spite of his inter-pupil distance adjustment and perform stereoscopic observation.

When diopter of the eyepiece lens systems is fixed at −1 dioptry in the eleventh embodiment, it is sufficient to move the optical axes of the eyepiece lens systems outward, or rightward and leftward, for a distance of 1.5 mm (Δ=1.5 mm) from the centers of the images. In this condition, Δ has a value which satisifes the condition (4). When the eyepiece lens systems are moved as described above, the observer's eyes. of vision directed to the centers of the visual fields are verged to each other so far as the observer's eyes are located at any positions within the exit pupils of the eyepiece lens systems. Accordingly, the twelfth embodiment of the present invention allows all the observers that have. inter-pupil distances within the ordinary distribution range thereof to easily fuse images in spite of the inter-pupil distance adjustment and the diopter adjustment, and perform stereoscopic observations with little fatigue.

In both the eleventh and twelfth embodiments of the present invention described above, the inclination of the optical axes of the eyepiece lens systems may be less and the parallel shift distance of the eyepiece lens systems may be shorter as a distance as measured from the centers of the images to the centers of the exit pupils is shorter. When images formed on monitors are used as images to be observed through the eyepiece lens systems as shown in FIG. 24, less inclination of the optical axes of the eyepiece lens systems and a short parallel shift distance thereof are very advantageous for configuring the stereoscopic microscope to be compact and simplifying a composition thereof. It is therefore most desirable to observe through a direct-viewing type magnifying lens systems (to observe through eyepiece lens systems disposed just over the monitors) which have exit pupils located at the shortest distance from the centers of the images. For configuring a compact eyepiece lens system which has an exit pupil diameter of 12 mm or larger, it is desirable to satisfy the conditions listed below:

$$20° \leq \omega \leq 43.5° \quad (9)$$

$$21.8 \text{ mm} \leq L_m \leq 57 \text{ mm} \quad (10)$$

$$12 \text{ mm} \leq De \leq 31.3 \text{ mm} \quad (11)$$

$$2.5 \leq F_{no} \leq 6.53 \quad (12)$$

$$3.19 \leq \beta_{oc} \leq 21.8 \quad (13)$$

wherein the reference symbol $\omega$ represents a field angle of an eyepiece lens system on one side thereof, the reference symbol $L_m$ designates a horizontal length of a monitor, the reference symbol De denotes an exit pupil diameter of the eyepiece lens system, the reference symbol $F_{no}$ represents an F number of the eyepiece lens system and the reference symbol $\beta_{oc}$ designates a magnification of the eyepiece lens system.

The condition (9) defines a lower limit of a field angle which is required for obtaining a minimum feeling of actuality of surgical operations and a field angle smaller than 20° will not provide such an actuality.

The condition (10) defines an upper limit which restricts a size of monitors so that they can be disposed side by side with a distance of 65 mm reserved between centers thereof while taking monitor frames into consideration. Monitors will have large sizes if the upper limit of the condition (10) is exceeded.

The condition (11) defines a lower limit of an exit pupil diameter of an eyepiece lens system so that it allows an observer having an inter-pupil distance within a normal variable range of inter-pupil distances of man to move his head for a certain distance during observation.

If an eyepiece lens system has an F number which is smaller than the lower limit of 2.5 of the condition (12), it will be difficult to correct aberrations from a viewpoint of lens design or it will be necessary to use a large number of lens components for composing the eyepiece lens system, thereby inevitably enlarging the eyepiece lens system.

In addition, the upper limit of the condition (9), the lower limit of the condition (10), the upper limit of the condition (11), the upper limit of the condition (12) and the condition (13) are determined by combining the following formulae, expressing a magnification and an F number of an eyepiece lens system with the boundary values described above:

$$\beta_{oc} = (500 \times \tan \omega) / L_m$$

$$F_{no} = L_m / (2 \times D \times \tan \omega)$$

The eleventh and twelfth embodiments of the stereoscopic microscope according to the present invention use eyepiece lens systems having numerical data which are listed below:

| | | |
|---|---|---|
| $r_1 = \infty$ (exit pupil) | | |
| $d_1 = 18.4000$ | | |
| $r_2 = 30.5750$ | | |
| $d_2 = 7.7000$ | $n_1 = 1.81600$ | $v_1 = 46.62$ |
| $r_3 = \infty$ | | |
| $d_3 = 4.4000$ | | |
| $r_4 = -67.4230$ | | |
| $d_4 = 6.3000$ | $n_2 = 1.76182$ | $v_2 = 26.52$ |
| $r_5 = 30.5390$ | | |
| $d_5 = 5.9000$ | | |
| $r_6 = 285.0480$ | | |
| $d_6 = 5.1000$ | $n_3 = 1.83481$ | $v_3 = 42.72$ |
| $r_7 = -53.5040$ | | |
| $d_7 = 0.5000$ | | |
| $r_8 = 36.1880$ | | |
| $d_8 = 12.5000$ | $n_4 = 1.83481$ | $v_4 = 42.72$ |
| $r_9 = -67.6910$ | | |
| $d_9 = 2.8000$ | $n_5 = 1.84666$ | $v_5 = 23.78$ |
| $r_{10} = 126.2960$ | | | focal length f = 38.25 mm, F number = 2.772,
field angle 2ω = 45.8°, magnification $\beta_{oc}$ = 6.54

FIG. 26 shows a thirteenth embodiment of the stereoscopic microscope according to the present invention wherein a concave lens component $L_n$ which has a diameter large enough to cover a right eyepiece lens system and a left eyepiece lens system is disposed over (on the side of observer's eyes) eyepiece lens systems for accomplishing the object of the present invention. The right and left eyepiece lens systems are disposed so that optical axes thereof pass through centers of visual fields and are in parallel to each other. In the thirteenth embodiment, observer's lines of vision directed to centers of visual field are verged by disposing the concave lens component. Accordingly, the thirteenth embodiment allows the observer to fuse images for stereoscopic observation. Owing to the fact that the optical axes of the eyepiece lens systems are in parallel to each other, the eyepiece lens systems are free from mutual interference and can be configured to be compact.

Further, the thirteenth embodiment is configured for direct observations of optical images and comprises diffusing plates 21 at the locations of images formed by the stereoscopic microscope as shown in FIG. 26 for enlarging numerical apertures of light bundles coming from the images, thereby enlarging exit pupils of the eyepiece lens systems.

In the thirteenth embodiment, the concave lens component disposed over the eyepiece lens systems has a focal length of −600 mm and the eyepiece lens systems satisfy the condition (5) when they have a diopter adjustable range from −6 to 2 dioptry.

In the thirteenth embodiment also, rays which have passed through exit pupils, out of rays emitted from centers of visual fields, are incident on the observer's eyes with vergence, whereby observer's lines of vision directed to the centers of the visual fields are verged to each other so far as observer's pupils are located at any positions within the exit pupils of the eyepiece lens systems. Accordingly, the thirteenth embodiment allows observers to easily fuse images in spite of the inter-pupil distance adjustment for stereoscopic observation.

Now, detailed description will be made of the concave lens component used in the third embodiment.

The concave lens component $L_n$ has the following numerical data:

$r_1 = -309.7980$
$\quad d_1 = 10.0000 \quad n_1 = 1.51633 \quad v_1 = 64.15$
$r_2 = \infty$ wherein the reference symbols $r_1$ and $r_2$ represent radii of curvature on surfaces of the concave lens component which are located on the side of the pupil 5 and on the side of the eyepiece lens system 4 respectively, the reference symbol $d_1$ designates thickness of the concave lens component, and the reference symbols $n_1$ and $v_1$ denote a refractive index and an Abbe's number of the concave lens component.

The thirteen embodiment satisfies the condition (6) when diopter of the eyepiece lens systems is fixed at −1 dioptry and the concave lens system has a focal length of −600 mm.

In the thirteenth embodiment, the observer's lines of vision directed to the centers of the visual fields are always verged so far as the observer's eyes are located at any positions within the exit pupils. Accordingly, the thirteenth embodiment allows all observers that have inter-pupil distances within the ordinary distribution range thereof to easily fuse images inspite of the inter-pupil distance adjustment and diopter adjustment, for enabling stereoscopic observations with little fatigue during the observations.

FIG. 27 illustrates a fourteenth embodiment of the stereoscopic microscope according to the present invention wherein wedge-shaped members (wedge-shaped prismst are disposed over (on the side of observer's eyes) right and left eyepiece lens systems for refracting outward or rightward and leftward light bundles emerging from the eyepiece lens systems. The eyepiece lens systems are the same as those used in the eleventh embodiment, but have optical axes which are parallel to each other. In the fourteenth embodiment, diffusing plates 21 are disposed over locations of images formed by the stereoscopic microscope for enlarging numerical apertures of light bundles coming from the images, thereby enlarging exit pupils of the eyepiece lens systems.

The fourteenth embodiment satisfies the condition (7) when the wedge-shaped members have an acute angle of 10° and the eyepiece lens systems have a diopter adjustable range from −6 to +2 dioptry. Accordingly, the fourteenth embodiment allows rays which have passed through the exit pupils, out of rays emitted from centers of visual fields, to be incident on observer's eyes at angles with vergence and permits an observer easily fusing images for stereoscopic observation.

The fourteenth embodiment satisfies the condition (8) when the wedge-shaped member's have an acute angle of 2° and diopter of the eyepiece lens systems is fixed at −1 dioptry. The wedge-shaped members are made of a material which has a refractive index n=1.51633 and an Abbe's number v=64.1. Accordingly, the observer's lines of vision directed to the centers of the visual fields are always verged so far as the observer's eyes are located at any positions within the exit pupils. As a result, the fourteenth embodiment allows all observers that have inter-pupil distances within the ordinary distribution range thereof to easily fuse images in spite of the inter-pupil distance adjustment and diopter adjustment, thereby permitting performing stereoscopic observations with little fatigue during observations.

Now, description will be made of an eyepiece optical system which is to be used for the stereoscopic microscope according to the present invention. This eyepiece optical system has an exit pupil diameter of at least 8 mm, and comprises: an eye lens component which is disposed on the side of observer's eyes and used commonly to right and left lens systems, and a pair of right and left lens systems which are composed of lens components other than the eye lens component and have optical axes in parallel to each other before they reach the eye lens component. This eyepiece optical system is characterized in that it satisfies the following condition (14):

$$f_e < -3.83D \tag{14}$$

wherein the reference symbol D represents a distance between the optical axes of the right and left lens systems, and the reference symbol $f_e$ designates a focal length of the eye lens component.

The pair of right and left lens systems other than the eye lens component are disposed so as to have the optical axes in parallel to each other for obtaining a high magnification of the eyepiece optical system and the single eye lens component is used commonly to the right and left lens systems for obtaining a vergence angle. The relationship among the focal length $f_e$ of the eye lens component, the distance D between the optical axes which are parallel to each other and a vergence angle α is expressed by:

$$\sin(\alpha/2) = -D/2f_e$$

A vergence angle α smaller than 15° in the formula mentioned above facilitates observation, whereas a vergence angle larger than 15° is too large for favorable stereoscopic observation. In other words, images can be fused with each other so far as the focal length $f_e$ of the eye lens component and the distance D between the optical axes are within a range which satisfies the above-mentioned condition (14).

Further, it is desirable for favorable observation by most observers to select the vergence angle α within a range defined below:

$$3° < \alpha < 8°$$

It is therefore desirable to select the focal length $f_e$ of the eye lens component within a range defined by the following condition (15):

$$-19.1D < f_e < -7.16D \tag{15}$$

The eye lens component has a weak refractive power and produces nearly no influence on aberrations. The eye lens component can therefore by composed of a single lens element. For correcting chromatic aberration in particular, however, it is desirable to select, for the eye lens component, a material which has a large Abbe's number defined by the following condition (16):

$$v_e > 60 \tag{16}$$

Even when the eye lens component is made of a material having a large Abbe's number, it will be difficult to correct chromatic aberration so as to intersect C-line with F-line and contours of images may be therefore colored during observations of small areas. It is preferable to configure the eye lens component as a cemented lens component for correcting such chromatic aberration. It is possible to intersect the C-line with the F-line by configuring the eye lens component as a cemented lens component consisting of a concave lens element and a convex lens element which satisfy the following condition (17):

$$v_{1n} > v_{1p} \tag{18}$$

wherein the reference symbol $v_{1p}$ represents an Abbe's number of the convex lens element and the reference symbol $v_{1n}$ designates an Abbe's number of the concave lens element.

For facilitating design of the lens component used for intersecting the C-line with the F-line, it is desirable to select a large difference between $v_{1n}$ and $v_{1p}$ so as to satisfy the following condition (18):

$$v_{1n} - v_{1p} > 15 \tag{18}$$

Furthermore, asymmetrical aberrations produced in the eyepiece optical system may make an image appear concave when two images are viewed by both eyes and fused with each other. It is effective to use an aspherical surface on the lens component which is used in common with the right and left lens systems.

The eyepiece optical system according to the present invention is composed, in order from the side of observer's eyes, of a first lens unit composed of an eye lens component used in common with right and left lens systems, a pair of right and left second lens units each of which comprise a convex lens element, a meniscus lens element having a concave surface on the side of the observer's eyes and a convex lens element, and a pair of right and left third lens units each of which is composed of a negative meniscus lens component having a concave surface on the object side.

For the eyepiece optical system which has the composition described above, it is desirable for prolonging an eye relief of the optical system to configure the third lens unit so as to have a negative refractive power and it is effective for correcting aberrations to compose the third lens unit of a cemented lens component consisting of a convex lens element and a concave lens element. It is preferable to configure the third lens unit so as to satisfy the following conditions (19) and (20):

$$n_{3n} - n_{3p} > 0.15 \tag{19}$$

$$v_{3p} - v_{3n} > 40 \tag{20}$$

wherein the reference symbols $n_{3p}$ and $v_{3p}$ represent a refractive index and an Abbe's number respectively of the convex lens element disposed in the cemented lens component of the third lens unit, and the reference symbols $n_{3n}$ and $v_{3n}$ designate a refractive index and an Abbe's number respectively of the concave lens element disposed in the cemented lens component of the third lens unit.

If the condition (19) or (20) is not satisfied, marginal coma and chromatic aberration will be aggravated.

In the eyepiece optical system according to the present invention, a light bundle diverged by the first lens unit enlarges a diameter of the second lens unit, thereby allowing interference between the right and left lens systems. For reducing the diameter of the second lens unit, it is effective to configure the second lens element to be used in the second lens unit as a meniscus lens element which has a convex surface on the object side and a weak refractive power. It is desirable to configure this meniscus lens element so as to have a focal length $f_m$ which satisfies the following condition (21):

$$|f_m| > 500 \tag{21}$$

Further, axial chromatic aberration (a spot image) can be reduced by selecting a refractive index of 1.7 or higher for the meniscus lens element. If this lens element has a refractive index lower than 1.7, resolution will be degraded.

The meniscus lens element to be disposed in the second lens unit can be thickened without degrading optical performance thereof. By utilizing this fact, it is possible to deflect the optical axis of the lens system nearly perpendicularly by disposing a reflecting surface on the second lens. element to be disposed in the second lens unit. Such deflection of the optical axis allows an observer to bring his eyes closer to an object to be observed. The eyepiece optical system according to the present invention which has the composition described above is apt to allow interference to occur between the right and left lens systems due to a fact that the lens system has a maximum diameter in the vicinity of an object side surface of the second meniscus lens element disposed in the second lens unit. It is possible to prevent such interference between the right and left lens systems by deflecting the optical axis in the second lens element.

Preferred embodiments of the eyepiece optical systems to be used in the stereoscopic microscope according to the present invention will be described below in forms of numerical data:

| Embodiment 15 | | |
| --- | --- | --- |
| $r_1 = -393.39352$ | | |
| $d_1 = 10.000000$ | $n_1 = 1.48749$ | $v_1 = 70.2$ |
| $r_2 = 1065.13991$ | | |
| $d_2 = 3.000000$ | | |
| $r_3 = 53.43526$ | | |
| $d_3 = 8.364285$ | $n_2 = 1.72916$ | $v_2 = 54.7$ |
| $r_4 = -188.98746$ | | |
| $d_4 = 9.339455$ | | |
| $r_5 = -30.81010$ | | |
| $d_5 = 4.000000$ | $n_3 = 1.76182$ | $v_3 = 26.6$ |
| $r_6 = 821.18509$ | | |
| $d_6 = 18.908563$ | $n_4 = 1.816$ | $v_4 = 46.6$ |
| $r_7 = -44.36187$ | | |
| $d_7 = 11.349575$ | | |

-continued

Embodiment 15

$r_8 = 96.37447$
$d_8 = 9.255946$    $n_5 = 1.85026$    $v_5 = 32.3$
$r_9 = -123.37158$
$d_9 = 0.500000$
$r_{10} = 29.92467$
$d_{10} = 15.282176$    $n_6 = 1.48749$    $v_6 = 70.2$
$r_{11} = -38.30857$
$d_{11} = 3.000000$    $n_7 = 1.84666$    $v_7 = 23.8$
$r_{12} = 34.06918$
$d_{12} = 10.000000$
$r_{13} = \infty$ (image surface)
D = 61.6434 (mm), $\alpha = 6°$, eye relief = 32 (mm),
exit pupil diameter = 15 (mm), f = 41.67 (mm),
$f_e/D = -9.54$, $f_m = -1970.5$ (mm)

Embodiment 16

$r_1 = -1055.39704$
$d_1 = 10.000000$    $n_1 = 1.816$    $v_1 = 46.6$
$r_2 = 229.15045$
$d_2 = 7.540827$    $n_2 = 1.72825$    $v_2 = 28.5$
$r_3 = 1353.78759$
$d_3 = 3.000000$
$r_4 = 50.13466$
$d_4 = 9.304981$    $n_3 = 1.72916$    $v_3 = 54.7$
$r_5 = -166.20843$
$d_5 = 9.018012$
$r_6 = -34.21157$
$d_6 = 6.000000$    $n_4 = 1.84666$    $v_4 = 23.8$
$r_7 = 548.34579$
$d_7 = 15.049838$    $n_5 = 1.85026$    $v_5 = 32.3$
$r_8 = -43.71554$
$d_8 = 2.148731$
$r_9 = 124.81650$
$d_9 = 6.741834$    $n_6 = 1.816$    $v_6 = 46.6$
$r_{10} = -161.04336$
$d_{10} = 0.500000$
$r_{11} = 36.97694$
$d_{11} = 16.736604$    $n_7 = 1.48749$    $v_7 = 70.2$
$r_{12} = -34.07137$
$d_{12} = 4.500000$    $n_8 = 1.84666$    $v_8 = 23.8$
$r_{13} = 60.81231$
$d_{13} = 9.999958$
$r_{14} = \infty$ (image surface)
D = 61.2772 (mm), $\alpha = 6°$, eye relief = 32 (mm),
exit pupil diameter = 15 (mm), f = 41.67 (mm),
$f_e/D = -9.6$, $f_m = 5344.4$ (mm)

Embodiment 17

$r_1 = -998.78475$
$d_1 = 6.000000$    $n_1 = 1.816$    $v_1 = 46.6$
$r_2 = 320.83665$
$d_2 = 4.150449$    $n_2 = 1.84666$    $v_2 = 23.8$
$r_3 = 868.10816$
$d_3 = 3.000000$
$r_4 = 88.56845$
$d_4 = 7.538481$    $n_3 = 1.7495$    $v_3 = 35.3$
$r_5 = -48.63474$
$d_5 = 3.097683$
$r_6 = -37.08448$
$d_6 = 6.000000$    $n_4 = 1.84666$    $v_4 = 23.8$
$r_7 = \infty$
$d_7 = 60.000000$    $n_5 = 1.79952$    $v_5 = 42.2$
$r_8 = \infty$
$d_8 = 11.000000$    $n_6 = 1.72916$    $v_6 = 54.7$
$r_9 = -63.87457$
$d_9 = 0.500000$
$r_{10} = 58.80763$
$d_{10} = 10.838736$    $n_7 = 1.62041$    $v_7 = 60.3$
$r_{11} = -498.24996$ -continued Embodiment 17

$d_{11} = 0.500000$
$r_{12} = 33.10588$
$d_{12} = 16.542474$    $n_8 = 1.6425$    $v_8 = 58.4$
$r_{13} = -79.65138$
$d_{13} = 8.237983$    $n_9 = 1.84666$    $v_9 = 23.8$
$r_{14} = 18.22809$
$d_{14} = 7.096020$
$r_{15} = \infty$ (image surface)
D = 61.2772 (mm), $\alpha = 6°$, eye relief = 25 (mm),
exit pupil diameter = 15 (mm), f = 41.67 (mm),
$f_e/D = -9.6$, $f_m = -4531.39$ (mm)

wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

Figure 28:
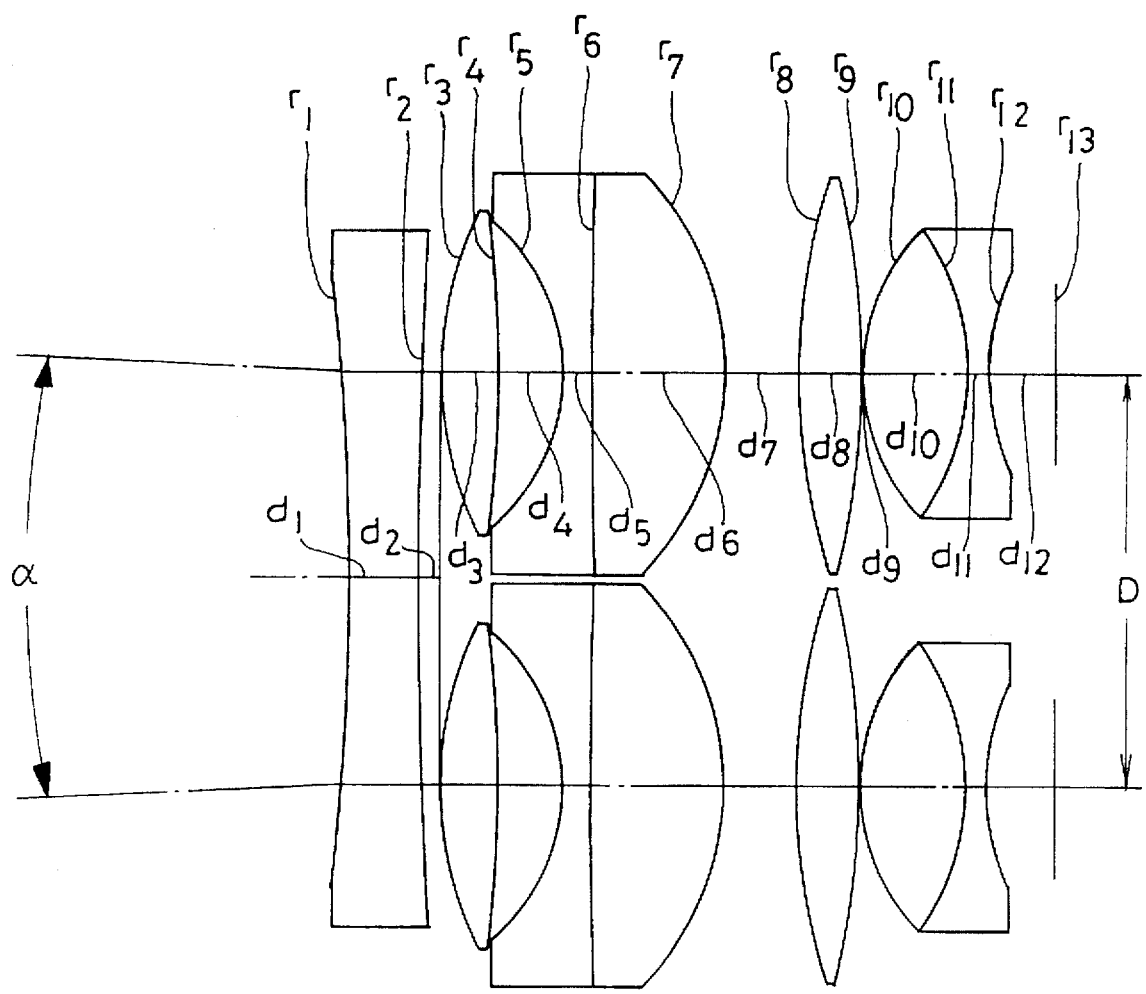
FIG. 28 shows a sectional view illustrating a composition of a fifteenth embodiment of the present invention.

The fifteenth embodiment has a composition illustrated in FIG. 28, wherein the eyepiece optical system is composed, in order from the side of the observer's eyes, of a first lens unit consisting of a biconcave lens component used commonly to right and left lens systems, second lens units each of which consists of a biconvex lens component and a cemented meniscus lens component consisting of a negative lens element and a positive lens element, and third lens units each of which consists of a cemented meniscus lens component consisting of a positive lens element and a negative lens element: the second lens unit and the third lens unit being composed of the lens elements and lens components which are disposed symmetrically with regard to a center axis of the eyepiece optical system.

Figure 29:
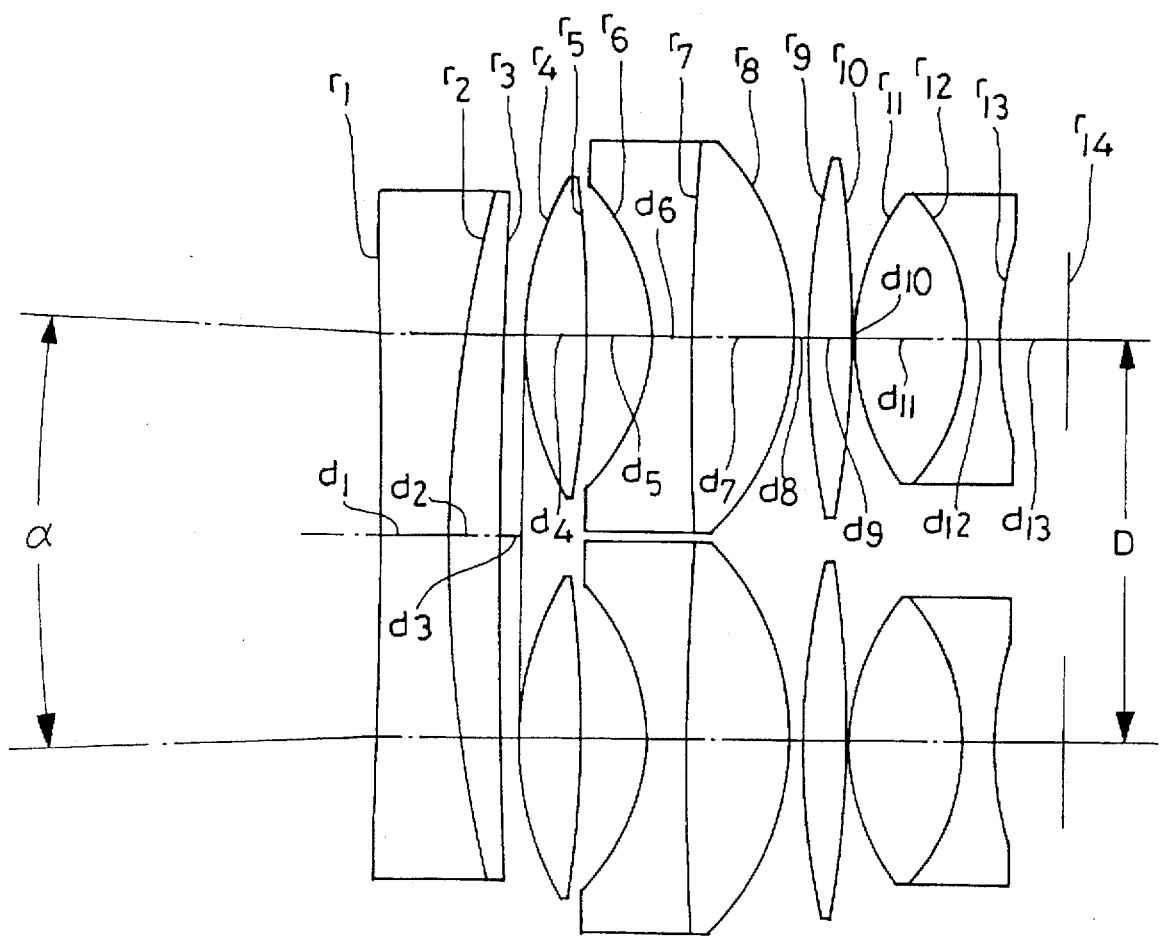
FIG. 29 shows a sectional view illustrating a composition of a sixteenth embodiment of the present invention.

The sixteenth embodiment has a composition illustrated in FIG. 29 wherein, a first lens unit is configured as a cemented lens component. Speaking concretely, the sixteenth embodiment is composed, in order from the side of the observer's eyes, of a first lens unit which consists of a cemented lens component composed of lens element and a positive lens element used commonly to right and left lens systems; second lens units each of which consists of a biconvex lens component, a cemented meniscus lens component consisting of a negative lens element and a positive lens element, and a biconvex lens component; and third lens units each of which consists of a cemented meniscus lens component consisting of a positive lens element and a negative lens element.

Figure 30:
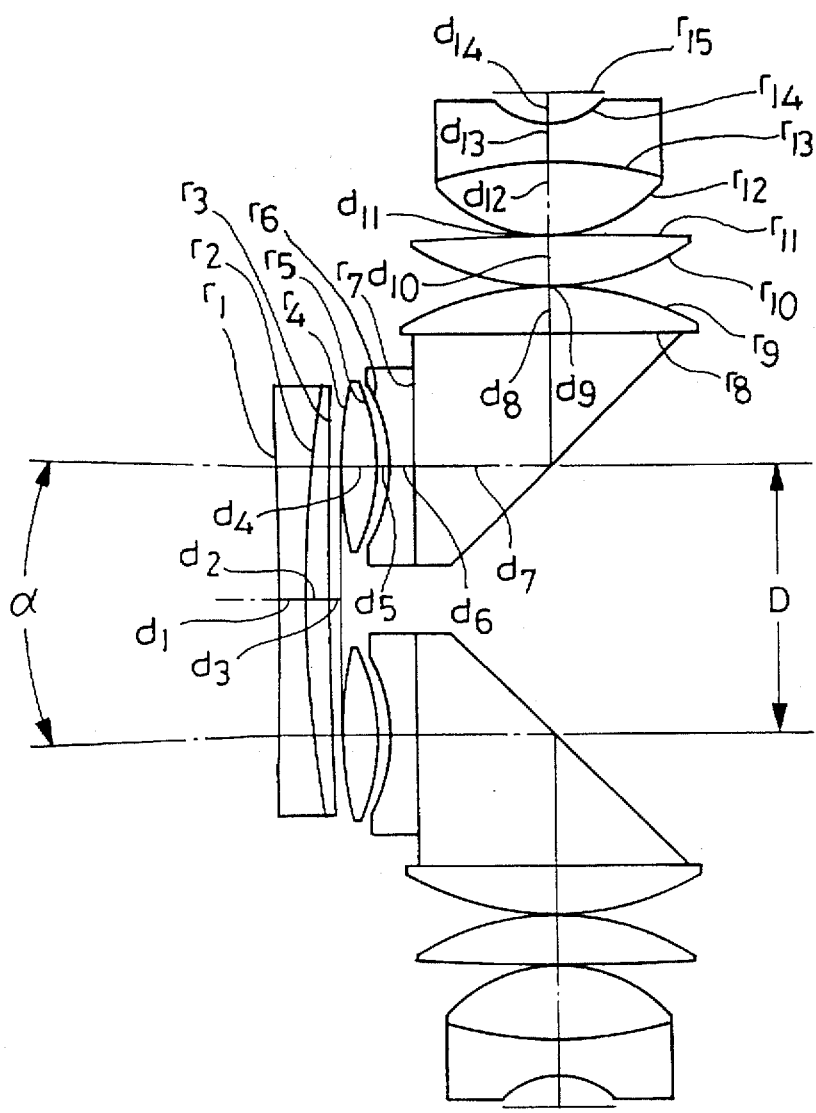
FIG. 30 shows a sectional view illustrating a composition of a seventeenth embodiment of the present invention.

The seventeenth embodiment has a composition illustrated in FIG. 30. The composition of the seventeenth embodiment is the same as that of the sixteenth embodiment, except for reflecting surfaces which are disposed in the second lens units for deflecting the optical axes of the lens systems.

The eyepiece optical systems preferred as the fifteenth through seventeenth embodiments described above are applicable not only to the stereoscopic microscope according to the present invention but also other optical systems for binocular observations such as binoculars.

We claim:
1. A stereoscopic microscope comprising:
 right and left eyepiece lens systems for magnified observation of two aerial images which are formed with parallax therebetween and independently of each other at locations different from each other,
 wherein said stereoscopic microscope comprises a main body housing, and an eyepiece body housing which is attachable and detachable to and from said body housing, wherein transmission type light diffusing devices are disposed proximate to right and left aerial images formed nearest an observer's eyes in an observation optical system of said stereoscopic microscope, and wherein an eyepiece body optical system of the observation optical system ranges from imaging lenses for forming said aerial images nearest said observer's eyes to said eyepiece lens system, and said light diffusing devices being disposed in said eyepiece body housing.

2. A stereoscopic microscope according to claim 1 wherein said light diffusing devices are movably disposed so as to be settable and removable into and out of optical paths of said observation optical system.

3. A stereoscopic microscope according to claim 1, further comprising electronic image display devices having liquid crystal panels, and wherein said light diffusing devices are movably disposed and replaceable with said electronic image display devices.

4. A stereoscopic microscope according to claim 1, wherein said light diffusing devices are vibratably or rotatably arranged.

5. A stereoscopic microscope according to claim 4, wherein said eyepiece body housing comprises a driving means for vibrating or rotating said light diffusing devices.

6. A stereoscopic microscope according to claim 1, wherein said light diffusing devices and eyepiece lens systems of said observation optical system are integrated into a unit, said unit being attachable and detachable to and from said eyepiece body housing.

7. A stereoscopic microscope according to claim 1 wherein said eyepiece lens systems having exit pupils whose diameter is 8 mm or longer, and wherein two light bundles which are emitted from centers of said two aerial images and emerge from said eyepiece lens systems are inclined in directions away from each other.

8. A stereoscopic microscope according to claim 7 wherein said eyepiece lens systems have optical axes located at positions parallelly shifted outward or rightward and leftward from said two right and left aerial images.

9. A stereoscopic microscope according to claim 8 wherein said two eyepiece lens systems have optical axes which are eccentric from centers of said two aerial images and satisfy the following condition:

$$\Delta > f^{D_e} \cdot |a|/2000$$

wherein the reference symbol $\Delta$ represents an eccentrical distance of the eyepiece lens systems, and the reference symbols $D_e$ and a designates a diameter of exit pupils and diopter respectively of said eyepiece lens systems.

10. A stereoscopic microscope according to claim 7 wherein said two eyepiece lens systems have optical axes which are inclined in directions away from each other and satisfy the following condition:

$$\theta > \tan^{-1} (D_e \cdot |a|/2000)$$

wherein the reference symbol $\theta$ represents an outward inclination angle of the optical axes of said right and left eyepiece lens systems, and the reference symbols $D_e$ and a designate a diameter of exit pupils and diopter respectively of said eyepiece lens systems.

11. A stereoscopic microscope according to claim 7 wherein said two eyepiece lens systems have optical axes which are inclined in directions always from each other toward an observer and satisfy the following condition:

$$2.1° < \theta' < 8.2°$$

wherein the reference symbol $\theta$ represents the outward inclination angle of said right and left eyepiece lens systems.

12. A stereoscopic microscope according to claim 7 wherein said eyepiece optical system comprises an eye lens component which covers the optical paths of said two eyepiece lens systems and has a negative refractive power, and satisfies the following condition:

$$f_n < [1000 \; (D_e - 65)/D_e \cdot |a|]$$

wherein the reference symbol $f_n$ represents a focal length of said eye lens component, and the reference symbols $D_e$ and a designate a diameter of exit pupils and diopter respectively of said eyepiece lens systems.

13. A stereoscopic microscope according to claim 7 wherein said eyepiece optical systems comprise wedge-shaped members disposed in the optical paths of the eyepiece lens systems and satisfies the following condition:

$$\delta > \tan^{-1} [\sin (\tan^{-1}(D_e \cdot |a|/2000))/(n - \cos (\tan - 1 \; (D_e \cdot |a|/2000)))]$$

wherein the reference symbol $\delta$ represents an acute angle of said wedge-shaped members, the reference symbol n designates a refractive index of said wedge-shaped members, and the reference symbols $D_e$ and a denote a diameter of exit pupils and diopter respectively of said eyepiece lens systems.

14. A stereoscopic microscope according to claim 12 wherein said two eyepiece lens systems have optical axes which are disposed so as to be substantially in parallel to each other at a location where rays are incident on said eye lens component and satisfy the following condition:

$$f_e < -3.83D$$

wherein the reference symbol $f_s$ represents a focal length of said eye lens component, and the reference symbol $f_e$ designates a distance between optical axes of said right and left eyepiece lens systems at the location where rays are incident on said eye lens component.

15. A stereoscopic microscope according to claim 14 satisfying the following condition:

$$-19.1D < f_e < -7.16D$$

16. A stereoscopic microscope according to claim 14 wherein said eye lens component is composed of a single lens element and has an Abbe's number satisfying the following condition:

$$v_s > 60$$

wherein the reference symbol $v_s$ represents the Abbe's number of the eye lens component.

17. A stereoscopic microscope according to claim 16 wherein said eye lens component is composed of a cemented lens component consisting of a positive lens element and a negative lens element, and said positive lens element and said negative lens element have Abbe's numbers satisfying the following condition:

$$v_{1n} > v_{1P}$$

wherein the reference symbol $v_{1P}$ represents an Abbe's number of said positive lens element and the reference symbol $v_{1n}$ designates an Abbe's number of said negative lens element.

18. A stereoscopic microscope according to claim 16 satisfying the following condition:

$$v_{1n} - v_{1P} > 15$$

19. A stereoscopic microscope according to claim 18 wherein each of said right and left eyepiece lens systems is composed of three lens units: a second lens unit having a negative refractive power, a third lens unit consisting of a negative meniscus lens component having a concave surface on the object side and a lens unit consisting of said eye lens component which is disposed on the side of observer's eyes.

20. A stereoscopic microscope according to claim 19 wherein said third lens unit is composed of a cemented lens component consisting of a positive lens element and a negative lens element, and satisfies the following conditions:

$$n_{3n} - n_{3p} > 0.15$$

$$\nu_{3p} - \nu_{3n} > 40$$

wherein the reference symbols $n_{3p}$ and $\nu_{3p}$ represent a refractive index and an Abbe's number respectively of said positive lens element, and the reference symbols $n_{3n}$ and $\nu_{3n}$ designate a refractive index and an Abbe's number respectively of said negative lens element.

21. A stereoscopic microscope according to claim 19 wherein said second lens unit is composed of a positive lens component, a meniscus lens component and a positive lens component, and said meniscus lens component has a concave surface on the side of observer's eyes and a weak refractive power.

22. A stereoscopic microscope according to claim 21 wherein the meniscus lens component disposed in said second lens unit is a negative meniscus lens component which has a refractive index of 1.7 or higher and satisfies the following condition:

$$|f_m| > 500$$

wherein the reference symbol $f_m$ represents a focal length of said meniscus lens component disposed in said second lens unit.

23. A stereoscopic microscope according to claim 19 wherein said meniscus lens component has a reflecting surface which deflects an optical axis of said second lens unit.

24. A stereoscopic microscope comprising:

right and left eyepiece lens systems for magnified observation of two aerial images which are formed with parallax therebetween and independently of each other at locations different from each other, wherein said stereoscopic microscope comprises a main body housing, and an eyepiece body housing which is attachable and detachable to and from said body housing, wherein transmission type light diffusing devices are disposed proximate to right and left aerial images formed nearest an observer's eyes in an observation optical system of said stereoscopic microscope, wherein an eyepiece body optical system of the observation optical system ranges from imaging lenses for forming said aerial images nearest said observer's eyes to said eyepiece lens system, and said light diffusing devices being disposed in said eyepiece body housing, wherein said light diffusing devices are rectangular-lattice-like micro lens arrays on which a distance between a peak of a micro lens and that of a micro lens adjacent thereto satisfies the following condition:

$$540 \text{ nm}/\sin [\tan^{-1} (AS_{MAX}/f_{S1})] \leq P \leq 100 \text{ }\mu m$$

wherein the reference symbol P represents the distance between adjacent microlenses, the reference symbol $AS_{MAX}$ designates a maximum diameter of an aperture stop disposed in the stereoscopic microscope and the reference symbol $f_{S1}$ denotes a focal length of said imaging lens.

25. A stereoscopic microscope comprising:

right and left eyepiece lens systems for magnified observation of two aerial images which are formed with parallax therebetween and independently of each other at locations different from each other, wherein said stereoscopic microscope comprises a main body housing, and an eyepiece body housing which is attachable and detachable to and from said body housing, wherein transmission type light diffusing devices are disposed proximate to right and left aerial images formed nearest an observer's eyes in an observation optical system of said stereoscopic microscope, wherein an eyepiece body optical system of the observation optical system ranges from imaging lenses for forming said aerial images nearest said observer's eyes to said eyepiece lens system, and said light diffusing devices being disposed in said eyepiece body housing, wherein said light diffusing devices are hexagonal-lattice-like micro lens arrays on which a distance between a peak of a micro lens and that of a micro lens adjacent thereto satisfies the following condition:

$$540 \text{ nm}/[\sin (\tan^{-1} (AS_{MAX}/f_{S1}) \cos 30°] \leq P' \leq 100 \text{ }\mu m$$

wherein the reference symbol P' represents the distance between the peak of the micro lens and that of the micro lens adjacent thereto, the reference symbol $AS_{MAX}$ designates a maximum diameter of an aperture stop disposed in said stereoscopic microscope (a diameter in an open condition of the aperture stop), and the reference symbol $f_{S1}$ denotes a focal length of said imaging lens.

26. A stereoscopic microscope comprising:

an observation optical system for magnified observations of microscopic images and for magnified observations of electronic images formed on an electronic image display device, said observation optical system being disposed in an eyepiece body housing, wherein said eyepiece body housing comprises a means for switching between microscopic observation and electronic image observation.

27. A binocular observation apparatus having eyepiece lens systems, comprising:

a main body housing; and an eyepiece body housing which is attachable and detachable to and from said main body housing, wherein transmission type light diffusing devices are disposed proximate to locations of aerial images formed nearest an observer's eyes in an observation optical system of said binocular observation apparatus, and wherein an eyepiece optical system of said observation optical system ranges from imaging lenses for forming said aerial images nearest said observer's eyes to said eyepiece lens systems, includes said light diffusing devices, and is disposed in said eyepiece body housing.

28. A monocular observation apparatus having an eyepiece lens system, comprising:

a main body housing; and an eyepiece body housing which is attachable and detachable to and from said main body housing, wherein a transmission type light diffusing device is disposed proximate to a location of an aerial image formed nearest an observer's eye in an observation optical system of said monocular observation apparatus, and wherein an eyepiece body optical system of said observation optical system ranges from imaging lenses for forming said aerial images nearest said observer's eyes to said eyepiece lens systems, includes said light diffusing devices, and is disposed in said eyepiece body housing.

* * * * *